United States Patent
Gabriel et al.

(10) Patent No.: US 12,114,680 B2
(45) Date of Patent: Oct. 15, 2024

(54) AERATED BEVERAGE COMPOSITION, PROCESS OF PREPARING THEREOF, AND IMPLEMENTATIONS THEREOF

(71) Applicant: ITC LIMITED, Bangalore (IN)

(72) Inventors: Christopher Gabriel, Bangalore (IN); Rushikesh Pandya, Bangalore (IN); Anuj Kumar Rustagi, Bangalore (IN); Sudhir Puri, Bangalore (IN)

(73) Assignee: ITC LIMITED, Bangalore (IN)

( * ) Notice: Subject to any disclaimer, the term of this patent is extended or adjusted under 35 U.S.C. 154(b) by 291 days.

(21) Appl. No.: 16/892,120

(22) Filed: Jun. 3, 2020

(65) Prior Publication Data

US 2021/0378265 A1  Dec. 9, 2021

(51) Int. Cl.
| | |
|---|---|
| *A23L 2/54* | (2006.01) |
| *A23F 5/40* | (2006.01) |
| *A23F 5/44* | (2006.01) |
| *A23L 2/60* | (2006.01) |
| *A23L 27/30* | (2016.01) |
| *A23L 29/30* | (2016.01) |

(52) U.S. Cl.
CPC ............. *A23L 2/54* (2013.01); *A23F 5/405* (2013.01); *A23F 5/44* (2013.01); *A23L 2/60* (2013.01); *A23L 27/33* (2016.08); *A23L 27/34* (2016.08); *A23L 29/35* (2016.08); *A23V 2002/00* (2013.01)

(58) Field of Classification Search
CPC .... A23L 2/54; A23F 5/405; A23F 5/44; A23F 5/28
See application file for complete search history.

(56) References Cited

U.S. PATENT DOCUMENTS

| | | | |
|---|---|---|---|
| 6,713,113 B2 | 3/2004 | Bisperink et al. | |
| 2007/0128326 A1* | 6/2007 | Milo | A23L 2/39 426/594 |
| 2017/0119006 A1 | 5/2017 | Ragnarsson | |

FOREIGN PATENT DOCUMENTS

WO   2011/107827 A1   9/2011

* cited by examiner

*Primary Examiner* — Jeffrey P Mornhinweg
(74) *Attorney, Agent, or Firm* — Workman Nydegger

(57) ABSTRACT

An aerated beverage composition is described herein. The aerated beverage composition comprises coffee having a weight percentage in a range of 0.1-20% with respect to the aerated beverage composition, at least one structurant having a weight percentage in a range of 10-40% with respect to the aerated beverage composition, at least one sweetener having a weight percentage in a range of 21-60% with respect to the aerated beverage composition, at least one solvent. The viscosity of the aerated beverage composition is in a range of 10,0000-3,40,000 cps. The aerated beverage composition, when reconstituted with water, provides a creamy, frothy, and stable ready-to-drink beverage. The present disclosure also provides a simple and convenient process for preparing the aerated beverage composition.

17 Claims, No Drawings

AERATED BEVERAGE COMPOSITION, PROCESS OF PREPARING THEREOF, AND IMPLEMENTATIONS THEREOF

FIELD OF INVENTION

The present disclosure broadly relates to the field of beverage composition and particularly relates to an aerated beverage composition comprising coffee, a ready-to-drink beverage obtained by the aerated beverage composition, and a process for preparing the aerated beverage composition and the ready-to-drink beverage.

BACKGROUND OF INVENTION

Coffee is one of the most popular beverages consumed by people from all over the world. Conventionally, there are various types of coffee products available in the market. The commercially available coffee contains different amounts of caffeine. The amount of caffeine in a cup of coffee can also vary considerably depending on whether it is brewed, instant, espresso, or decaffeinated. Various forms of coffee products are available in the market that is convenient to be used by the users, namely, instant mix coffee powder, instant pure coffee powder, and soluble beverage powders, or ready-to-drink liquid beverages, etc. While these types of instant coffee products are commercially available, the individual components present in most of the instant coffee products differ such that the desired ratios of the components do not complement each other in providing the desired features. This, in turn, leaves aesthetically unappealing clumps of undissolved instant coffee product floating on the top of the beverage or as a sediment in the bottom of the drinking vessel, thereby inferring to the instability of the coffee drink. To get a completely dissolved product, the consumer tends to vigorously shake and stir such an instant coffee solution. However, the taste and texture of the coffee remain unsatisfactory to the consumers. Further, the prepared coffee drink does not exhibit the desired foam on its upper surface when the instant coffee mix is reconstituted with water.

Various attempts have been made to provide stable and instant foamed beverages from instant ready-to-mix or ready-to-drink beverages. For instance, U.S. Pat. No. 6,713, 113B2 relates to powdered soluble foamer ingredient for producing enhanced foam in foodstuffs and beverages. The particles of the powdered soluble foamer ingredient have a matrix containing carbohydrate and protein and entrapped gas. However, the powdered soluble foamer ingredient does not provide the coffee drink with the desired characteristics required for foaming upon reconstitution with water. Also, the powdered soluble foamer ingredient uses entrapped gas to provide a creamy and foamable coffee drink.

Another major concern is the use of stabilisers or additional components in the instant beverage products, such as glycerine, mono- and diglycerides, carrageenan, pectin, gum, glycerol to improve the stability, in particular aeration stability, in the concentrated products. The use of a few said stabilisers are disclosed in the patent document WO2011107827A1 that relates to an instant coffee comprising roasted coffee beans, flavor, foaming agent, and optionally sugar. The flavor comprises natural extracts, volatile oils, nature identical coconut flavor, coconut oil, maltodextrin, glucose, gum arabic, milk powder, stabilizer, emulsifying salt, and anticaking agent. The document also discloses the ready-to-drink obtained by adding water to the instant coffee. However, the use of large amounts of these additives, such as gums, stabilizers, etc. result in complexity to the manufacturing process, additional expense to the composition, and also can provide unexpected organoleptic characteristics and textures in the resulting beverage. The use of glycerol is disclosed in US20170119006A1. The patent document relates to low water, yet flowable, liquid beverage concentrates and methods for making the concentrates are also provided. The liquid beverage concentrates provided herein contain coffee and/or tea solids and can further be diluted in water or other aqueous liquid, such as milk, to provide a coffee or tea beverage. Additionally, the presence of glycerol, though maintains the water content without impacting the flowability of liquid beverage composition, imparts an off-note to the product. Notably, the beverage concentrate still remains liquid in nature. Liquid ready-to-mix formulations or ready-to-drink formulations, inherently, do not have any structure. Thus, as a format, liquid beverages have limited capability to provide a satisfactory mouth feel. On top of that, if beverage formulations are to be reconstituted in diluents, water or milk, these lose any remnant structure such that the customer remains devoid of mouth-feel satisfaction that is attained by a rich cup of coffee/beverage.

Another challenge for coffee formulators is the appearance of the end product. The product color is typically limited to the color of the substrate, i.e., tea, coffee, cacao, and hence may be brown, muddy, etc. Discoloration and precipitation of the substrates, such as tea, coffee, cocoa, and other ingredients such as stabilizers, foaming agents, aroma providing agents, leave the end cup of the beverages not very visually appealing, and hence not likeable by the consumers.

Yet another major area of concern as to the quality of such pre-mix is to maintain a good texture, and consistency of the pre-mix. Since the pre-mix are essentially concentrates and contain high quantities of formulating ingredients such as sugars, the problem of recrystallization and sedimentation is observed in such compositions. Such recrystallization and sedimentations are associated by consumers with low quality of the respective pre-mix. In the case of milk powders, the recrystallization of amorphous lactose has been associated with non-enzymatic browning of the powder (pre-mix). Due to the recrystallization and sedimentation problems, there is a loss in the texture of the pre-mix, and when the pre-mix is reconstituted with water or any solvent, the end-product obtained is also not desirable in terms of sensorial features.

Owing to the paramount commercial interests surrounding coffee, active research is going on in this field for achieving better market products, which can provide better sensorial and satisfaction to the customers.

Accordingly, there is a need in the art to provide a well-structured, viscous and shelf-stable aerated beverage formulation that provides the end consumers with better sensorial experience and that can be reconstituted to provide a high-quality ready-to-drink beverage with desired end cup froth, mouth feel, desired texture, structure and color stability.

SUMMARY OF THE INVENTION

In an aspect of the present disclosure, there is provided an aerated beverage composition comprising: (a) coffee having a weight percentage in a range of 0.1 to 20% with respect to the aerated beverage composition; (b) at least one structurant having a weight percentage in a range of 10-40% with respect to the aerated beverage composition; (c) at least one sweetener having a weight percentage in a range of 21-60% with respect to the aerated beverage composition; and (d) at least one solvent, wherein the aerated beverage composition has a viscosity in a range of 10,000-3,40,000 cps.

In a second aspect of the present disclosure, there is provided an aerated beverage composition consisting essentially of: (a) coffee having a weight percentage in a range of 0.1-20% with respect to the aerated beverage composition; (b) at least one structurant selected from the group consisting of glucose, liquid glucose, galactose, xylose, lactose, maltose, maltodextrin, trehalose, milk solids, non-diary creamers, and combinations thereof, having a weight percentage in a range of 10-40% with respect to the aerated beverage composition; (c) at least one sweetener selected from the group consisting of sucrose, fructose, liquid fructose, sorbitol, mannitol, maltitol, dextrose, inverted sugar, inverted sugar syrup, artificial sweetener, and combinations thereof, having a weight percentage in a range of 21-60% with respect to the aerated beverage composition; and (d) at least one solvent selected from the group consisting of water, milk, dissolved milk solids, dissolved non-dairy milk solids, and combinations thereof, having a weight percentage in a range of 10-30% with respect to the aerated beverage composition, wherein the aerated beverage composition has a viscosity in a range of 10,000-3,40,000 cps, and wherein the aerated beverage composition has a density in a range of 0.1-0.99 g/cm$^3$.

In a third aspect of the present disclosure, there is provided a process for preparing an aerated beverage composition comprising: (a) coffee having a weight percentage in a range of 0.1 to 20% with respect to the aerated beverage composition; (b) at least one structurant having a weight percentage in a range of 10-40% with respect to the aerated beverage composition; (c) at least one sweetener having a weight percentage in a range of 21-60% with respect to the aerated beverage composition; and (d) at least one solvent, wherein the aerated beverage composition has a viscosity in a range of 10,000-3,40,000 cps, said process comprising: contacting coffee, the at least one structurant, the at least one sweetener, and the at least one solvent, to obtain the aerated beverage composition.

In a fourth aspect of the present disclosure, there is provided a process for preparing an aerated beverage composition consisting essentially of: (a) coffee having a weight percentage in a range of 0.1-20% with respect to the aerated beverage composition; (b) at least one structurant selected from the group consisting of glucose, liquid glucose, galactose, xylose, lactose, maltose, maltodextrin, trehalose, milk solids, non-diary creamers, and combinations thereof, having a weight percentage in a range of 10-40% with respect to the aerated beverage composition; (c) at least one sweetener selected from the group consisting of sucrose, fructose, liquid fructose, sorbitol, mannitol, maltitol, dextrose, inverted sugar, inverted sugar syrup, artificial sweetener, and combinations thereof, having a weight percentage in a range of 21-60% with respect to the aerated beverage composition; and (d) at least one solvent selected from the group consisting of water, milk, dissolved milk solids, dissolved non-dairy milk solids, and combinations thereof, having a weight percentage in a range of 10-30% with respect to the aerated beverage composition, wherein the aerated beverage composition has a viscosity in a range of 10,000-3,40,000 cps, and wherein the aerated beverage composition has a density in a range of 0.1-0.99 g/cm$^3$, said process comprising: contacting coffee, the at least one structurant, the at least one sweetener, and the at least one solvent, to obtain the aerated beverage composition.

In a fifth aspect of the present disclosure, there is provided a ready-to-drink beverage obtained by reconstituting the aerated beverage composition comprising: (a) coffee having a weight percentage in a range of 0.1 to 20% with respect to the aerated beverage composition; (b) at least one structurant having a weight percentage in a range of 10-40% with respect to the aerated beverage composition; (c) at least one sweetener having a weight percentage in a range of 21-60% with respect to the aerated beverage composition; and (d) at least one solvent, wherein the aerated beverage composition has a viscosity in a range of 10,000-3,40,000 cps.

In a sixth aspect of the present disclosure, there is provided a ready-to-drink beverage obtained by reconstituting the aerated beverage composition consisting essentially of: (a) coffee having a weight percentage in a range of 0.1-20% with respect to the aerated beverage composition; (b) at least one structurant selected from the group consisting of glucose, liquid glucose, galactose, xylose, lactose, maltose, maltodextrin, trehalose, milk solids, non-diary creamers, and combinations thereof, having a weight percentage in a range of 10-40% with respect to the aerated beverage composition; (c) at least one sweetener selected from the group consisting of sucrose, fructose, liquid fructose, sorbitol, mannitol, maltitol, dextrose, inverted sugar, inverted sugar syrup, artificial sweetener, and combinations thereof, having a weight percentage in a range of 21-60% with respect to the aerated beverage composition; and (d) at least one solvent selected from the group consisting of water, milk, dissolved milk solids, dissolved non-dairy milk solids, and combinations thereof, having a weight percentage in a range of 10-30% with respect to the aerated beverage composition, wherein the aerated beverage composition has a viscosity in a range of 10,000-3,40,000 cps, and wherein the aerated beverage composition has a density in a range of 0.1-0.99 g/cm$^3$.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

DETAILED DESCRIPTION OF THE INVENTION

Those skilled in the art will be aware that the present disclosure is subject to variations and modifications other than those specifically described. It is to be understood that the present disclosure includes all such variations and modifications. The disclosure also includes all such steps, features, compositions, and compounds referred to or indicated in this specification, individually or collectively, and any and all combinations of any or more of such steps or features.

Definitions

For convenience, before further description of the present disclosure, certain terms employed in the specification, and examples are delineated here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

The term "coffee" as used in the present disclosure may be selected from coffee powder like, reduced density soluble coffee powder, roasted coffee bean (spray dried coffee, agglomerated coffee, freeze dried coffee), roasted & ground coffee, coffee decoction, liquid coffee, coffee extract, concentrated coffee extract. As per the present disclosure, coffee refers to the value-added product which is commercially available as a beverage.

As used herein, the term "aerated beverage composition" refers to a composition comprising coffee and entrapped air in specific weight percentages as disclosed herein. The aerated beverage composition can be reconstituted with water or milk to prepare a "coffee drink" or a "ready-to-drink beverage". The aerated composition of the present disclosure has a density in a range of 0.1-0.99 g/cm$^3$ and has a viscosity in a range of 10,000 to 3,40,000 cps. The aerated beverage composition can be used interchangeably with terms such as "instant mix", "pre-mix", "ready-to-mix", "coffee pre-mix" or the like. The term "ready-to-drink beverage" refers to the beverage which is obtained by reconstituting the aerated beverage composition of the present disclosure with water or milk. As the name clearly indicates, the ready-to-drink beverage refers to the beverage which can be consumed by the consumers as such. The ready-to-drink beverage is also referred to as an end cup beverage having the desired froth level on its surface.

The term "structurant" refers to any component that is added to the composition for imparting structural and functional benefits to the ready-to-mix composition of the present invention and the ready-to-drink formulation produced by reconstituting the ready-to-mix formulation of the present invention, and for example provides temperature stability in terms of phase separation, against recrystallization of sugars and color degeneration in the final formulation.

As used herein, the term "sweetener" is a food additive which is added to the composition to impart a sweet taste.

As used herein, the term "foam" refers to a light frothy mass formed in or on the surface of the end cup coffee beverage (generally milk, coffee or hot chocolate). "Foam" is generally a colloidal system (i.e., a dispersion of particles in continuous medium) that is achieved by utilizing a fine dispersion of gas in a liquid to form said mass on the beverage surface.

The term "creamer" as used herein, refers to an additive used in many ready-to-drink and instant beverage products. Commercial creamers are readily available and are readily chosen by those of ordinary skill in the art. As used herein, non-dairy creamers (also referred to as coffee whiteners) do not contain lactose and therefore are commonly called non-dairy products.

The term "recrystallization" is defined as the process where a solute that is dissolved in the solution gets precipitated in the form of crystals.

The term "aeration" refers to infusion or entrapment of gas or air into a substance like solid, liquid, solid-liquid base. The term "aerated beverage composition" refers to a product obtained by infusion or entrapment of gas or air into the composition which can be in a form of solid, liquid, solid-liquid base.

The term "shelf-life" refers to the extent to which the aerated beverage composition retains entrapped air, within the specific limits, throughout its period of storage and use, which provides the same sensorial properties and characteristics possessed at the time of its packaging. The composition can be stored at a temperature of 4° C.-25° C. for usually a period in a range of 48 hours to 12 months, and that is not affected by any microbial spoilage. Hence, the composition is shelf-stable also.

As described herein, monosaccharides are the simplest type of sugars. They are made only up of one molecule. This molecule is made up of a chain of carbon atoms. Each carbon atom is connected to oxygen and hydrogen atoms in a certain way. Examples of monosaccharides including, but not limited to glucose, fructose, galactose, ribose, xylose, rhamnose, arabinose, dextrose, mannose. In general, monosaccharides are soluble in water, have a low molecular weight and have a sweet taste. Monosaccharides, like all the carbohydrates, have the general molecular formula $(CH_2O)_n$, where n can be 3, 5 or 6. They can be classified according to the number of carbon atoms in a molecule: n=3, trioses, e.g. glyceraldehyde. n=5, pentoses, e.g. ribose and deoxyribose ('pent' indicates 5). n=6, hexoses, e.g. fructose, glucose, and galactose ('hex' indicates 6). Monosaccharide derivative refers to any form of derivative derived from the monosaccharide. For example, derivative include alcohol, esters, and the like. Examples of monosaccharide derivative including, but not limited to sorbitol, and mannitol.

Oligosaccharides are saccharide polymers with 3-10 units of monosaccharides. Examples of oligosaccharides, including, but not limited to isomalt, galactooligosaccharide, fructooligosaccharide, glucooligosaccharide, xylooligosaccharide, rhamnooligosaccharide, arabinooligosaccharide, mannooligosaccharide.

Polysaccharides are saccharide polymers with more than 10 repeating units of the monosaccharides. Examples of polysaccharide including, but not limited to maltodextrin, dextrin, gums.

The term "solid component" refers to ingredients that are present in a solid form, such as, in the form of powders or crystals. The term "liquid component" refers to ingredients that are added in liquid form. The component added in liquid form can have solids present in the composition. For example, liquid glucose (a liquid component) with a brix value of 80 would have 80% of glucose in a solid form.

The term "derivative" includes alcohol, esters, and the like.

The term "consisting essentially of" refers to the specified components recited therein, and also to the components that do not materially affect the basic and novel characteristics of the product.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

The present disclosure is not to be limited in scope by the specific implementations described herein, which are intended for the purposes of exemplification only. Functionally-equivalent products, compositions, and methods are clearly within the scope of the disclosure, as described herein.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature ranges of about 4-95° C. should be interpreted to include not only the explicitly recited limits of about 4° C. to about 95° C., but also to include sub-ranges, such as 5-90° C., 10-80° C., and so forth, as well as individual amounts, including fractional amounts, within the specified ranges, such as 4.5° C., and 94.5° C., for example.

As discussed in the background section of the present disclosure, conventional instant coffee beverages are perceived as thin and watery paste and do not develop a desirable amount of foam/froth head in a single step. The presence of additives like gum, pectin, carrageenan in the instant beverage composition fails to deliver a stable frothy coffee with desired sensorial features, such as mouthfeel, taste, color. Due to the separation of the ingredients into different phases, the coffee (end cup beverage) becomes unstable and undesirable for consumption. Further, due to the unequal balance of sugar and coffee in the coffee paste, the sugar may not be completely dissolved in the composition. Consequently, it leads to the recrystallization of sugars that deteriorates the texture, aroma, and, flavor of the coffee prepared by using these commercially available instant coffee compositions. Moreover, the conventional methods for preparing instant coffee composition are not able to entrap gases and or air and retain the entrapped gases and/or air for longer duration of time. Even though the commercial scale methods are available for entrapment of gases and/or air, however, such methods require factory set-ups. By manual mixing or beating, only a limited amount of air can be entrapped, and such air entrapment does not remain stable for a longer period of time. Further, the conventional methods are both time consuming, and tedious. Furthermore, the taste of coffee prepared from such preparation is dependent on the skill set of the individual preparing such a coffee beverage and also depends on the time of mixing coffee and sugar to get the desired flavor and texture of the coffee.

To overcome the aforementioned problems and to provide a composition that yields a ready-to-drink beverage having uniform features, the present disclosure provides an aerated beverage composition comprising coffee, and other ingredients. The aerated beverage composition can be quickly mixed with a diluent to arrive at the desired ready-to-drink beverage drink with desired sensorial properties. The aerated beverage composition, apart from being stable, retains color and texture also. Further, the composition of the present disclosure does not use additives like gum, pectin, carrageenan, or the like, thereby providing a highly stable aerated beverage composition and at the same time without leveraging the froth properties of the reconstituted ready-to-drink beverage. This has been accomplished by providing an aerated beverage composition comprising: a) coffee having a weight percentage in a range of 0.1-20% with respect to the aerated beverage composition; b) at least one structurant having a weight percentage in a range of 10-40% with respect to the aerated beverage composition; c) at least one sweetener having a weight percentage in a range of 21-60% with respect to the aerated beverage composition; and d) at least one solvent, wherein the aerated beverage composition has a viscosity in a range of 10,000-3,40,000 cps. Further, it has been noted that even when all the ingredients are present in the formulation, it is the ratio of the liquid to solid component present in the aerated beverage composition that is essential to ensure a consistent product with desired properties to the end-user. Moreover, the weight ratio of monosaccharide, or oligosaccharide, or polysaccharide, or combinations thereof to disaccharide in a range of 1:5 to 1:0.3 are essential for dissolving sweeteners completely in the composition that helps in minimizing the recrystallization of sugars and in achieving the aerated beverage composition with desired sweetness, color and shelf stability. The combination of ingredients used for making the aerated composition of the present disclosure delivers coffee with a high amount of froth and with desired texture, aroma, color, and taste. The present disclosure also provides an easy and convenient process for preparing the composition. Moreover, the present disclosure also provides a ready-to-drink beverage obtained by reconstituting the aerated beverage composition with a diluent. The ready-to-drink beverage obtained by reconstituting 5-15 grams of the aerated beverage composition in 100-150 ml of milk or water (at a temperature range of 4-95° C.) has a froth level in a range of 7-12 mm which is obtained without any extra step of froth creation.

In one implementation of the present disclosure, there is provided an aerated beverage composition comprising: a) coffee having a weight percentage in a range of 0.1-20% with respect to the aerated beverage composition; b) at least one structurant having a weight percentage in a range of 10-40% with respect to the aerated beverage composition; c) at least one sweetener having a weight percentage in a range of 21-60% with respect to the aerated beverage composition; and d) at least one solvent, wherein the aerated beverage composition has a viscosity in a range of 10,000-3,40,000 cps.

The present disclosure provides an aerated beverage composition comprising: (a) coffee broadly in a weight percentage range of 0.1-20% with respect to the aerated beverage composition, (b) at least one structurant broadly in a weight percentage range of 10-40% with respect to the aerated beverage composition; (c) at least one sweetener broadly in a weight percentage range of 21-60% with respect to the aerated beverage composition; (d) solvent broadly in a weight percentage range of 10-60% with respect to the aerated beverage. The weight percentage range of 0.1-20% is a broad range, and sub-ranges falling within this broad range are also contemplated by the present disclosure. In another implementation of the present disclosure, coffee has a weight percentage in a range of 0.1-18% with respect to the aerated beverage composition. In yet another implementation of the present disclosure, coffee has a weight percentage in a range of 0.2-16% with respect to the aerated beverage composition. Thus, in certain non-limiting examples, the weight percentage of coffee can be 0.2-15%, or 0.3-15%, or 1-15%, or 2-14%, or 5-12%, or 6-10%, or 10-15%

The structurants are the components that are not only added for imparting structural benefits to the aerated beverage composition of the present disclosure, but also provides functional benefits in terms of maintaining the stability, texture, and taste of the beverage drink obtained from such an aerated beverage composition. Further, adding the structurants in a broad weight percentage range of 10-40% with respect to the aerated beverage composition, minimizes recrystallization of sugars. At least one structurant as described herein, is selected from the group consisting of glucose, liquid glucose, galactose, xylose, lactose, maltose, maltodextrin, trehalose, milk solids, non-diary creamers, and combinations thereof, and having a weight percentage in a range of 10-40% with respect to the aerated beverage composition. Thus, in a set of non-limiting implementation, the weight percentage of the at least one structurant with respect to the composition can be in a range of 14-39%. In another implementation, the weight percentage of the at least one structurant with respect to the composition can be in a range of 12-39%. In certain non-limiting examples, the structurants include glucose, liquid glucose, maltose, glucitol, isomalt, lactose, maltodextrin, milk solids, non-dairy creamers, dextrin. The aerated beverage composition may include one structurant or a combination of structurants. In one example, the composition comprises one structurant. In another example, the composition comprises a combination of structurants. In compositions where more than one structurants are a part of the composition, the weight percentage range refers to the combined weight percentage of all the structurants present in the composition, and that combined or total weight percentage should fall within the range of 10-40% with respect to the aerated beverage composition of the present disclosure. Sub-ranges within this broad range are also intended to be falling within the scope of the disclosure. Further, the structurant can be present in a liquid form. In an example, the liquid glucose is a structurant present in liquid form.

The presence of the sweetener in the disclosed weight percentage range of 21-60% is essential for maintaining the sweetness taste and stability of the composition. Mixing the sweetener and the structurant in the right proportion along with the coffee and solvent in the disclosed weight percentage ranges is important for circumventing the problem of recrystallization of sugars. It can be contemplated that both structurant and sweetener can be in liquid or solid form. Examples of sweetener includes sucrose, fructose, liquid fructose, sorbitol, maltitol, mannitol, dextrose, artificial sweetener. In one implementation of the present disclosure, the aerated beverage composition comprises: a) coffee having a weight percentage in a range of 0.1-20% with respect to the aerated beverage composition; b) at least one structurant having a weight percentage in a range of 10-40% with respect to the aerated beverage composition; c) at least one sweetener having a weight percentage in a range of 21-60% with respect to the aerated beverage composition; and d) at least one solvent, in such a way that the viscosity of the aerated beverage composition is maintained in a range of 10,000-3,40,000 cps. In another implementation of the present disclosure, the weight percentage of the sweetener with respect to the composition can be 25-60%, 30-50%, 30-45%.

In certain non-limiting examples, the sweetener includes sucrose, liquid fructose, sorbitol, mannitol, maltitol, dextrose, inverted sugar, inverted sugar syrup, honey, brown sugar, jaggery, palm sugar, coconut syrup, maple syrup, and artificial sweetener. The aerated beverage composition as described herein, may include one sweetener or a combination of sweeteners. In one example, the composition comprises sucrose. In another example, the composition comprises a combination of sweeteners, such as, sucrose and dextrose. In yet another example, the composition comprises a combination of sweeteners, such as, sucrose, sorbitol, and liquid fructose. In one another example, the composition comprises a combination of sweeteners, such as, sucrose, sorbitol, liquid fructose, and artificial sweeteners. According to the present disclosure, the at least one sweetener can be present in a liquid form. In an example, the at least one sweetener which is in liquid form is liquid fructose.

The artificial sweeteners as described herein, may include, *stevia*, saccharin, aspartame, mannitol, maltitol, and combinations thereof. In compositions where more than one sweetener is a part of the composition, the weight percentage range refers to the combined weight percentage of all the sweeteners present in the composition, 21-60% with respect to the aerated beverage composition of the present disclosure.

Adding the solvent in the right proportion along with other ingredients, such as, coffee, at least one structurant, at least one sweetener, is highly important for arriving at the aerated beverage composition which is stable and has desired viscosity in a range of 10,000-3,40,000 cps. In one implementation of the present disclosure, the aerated beverage composition comprises: a) coffee having a weight percentage in a range of 0.1-20% with respect to the aerated beverage composition; b) at least one structurant having a weight percentage in a range of 10-40% with respect to the aerated beverage composition; c) at least one sweetener having a weight percentage in a range of 21-60% with respect to the aerated beverage composition; and d) at least one solvent having a weight percentage in a range of 10-30% with respect to the present disclosure, which is required for maintaining the viscosity in a range of 10,000-3,40,000 cps. In another implementation of the present disclosure, the weight percentage of the at least one solvent with respect to the aerated beverage composition can be in a range of 11-30%, 12-30%, 13-30%, 14-30%, 15-30% with respect to the aerated beverage composition.

Example of solvent includes water, milk, dissolved milk solids, dissolved non-dairy milk solids, and combinations thereof. In one example of the present disclosure, the at least solvent is water. In another example of the present disclosure, the at least one solvent is milk.

The aerated beverage composition according to the present disclosure comprises: a) coffee having a weight percentage in a range of 0.1-20% with respect to the aerated beverage composition; b) at least one structurant having a weight percentage in a range of 10-40% with respect to the aerated beverage composition; c) at least one sweetener having a weight percentage in a range of 21-60% with respect to the aerated beverage composition; and d) at least one solvent in a range of 10-30%, in such a way that the viscosity of the composition is maintained in a range of 10,000-3,40,000 cps, and density of the composition is maintained in a range of 0.1-0.99 g/cm$^3$.

In certain non-limiting examples of the present disclosure, the viscosity of the aerated beverage composition can be in a range of 20,000-3,20,000 cps, or 30,000-3,10,000 cps, or 40,000-3,00,000 cps, or 50,000-2,80,000 cps, or 1,00,000-2,00,000 cps.

The density of the aerated beverage composition is in a range of 0.1-0.99 g/cm$^3$. In certain non-limiting examples of the present disclosure, the density of the aerated beverage composition can be in a range of 0.4-0.8 g/cm$^3$, or 0.5-0.8 g/cm$^3$, or 0.6-0.7 g/cm$^3$.

The aerated beverage composition as described herein, further comprises coffee substitutes selected from the group consisting of chicory, herbal extracts, and combinations thereof. Although, any of these aforesaid coffee substitutes can be used individually with the coffee to arrive at the aerated beverage composition. It can be contemplated that compositions comprising a combination of aforesaid coffee substitutes also fall within the scope of the instant disclosure. In a non-limiting example, the composition comprises chicory as one of the coffee substitutes. In one implementation of the present disclosure, the coffee substitute can be in range of 0.1-20% with respect to the aerated beverage composition. In another limitation of the present disclosure, the coffee substitute can be in range of 0.3-18%, or 0.5-16%, or 0.8-14%, or 1-12%, or 4-10%, or 5-8%.

The aerated beverage composition comprising: (a) coffee having a weight percentage in a range of 0.1 to 20% with respect to the aerated beverage composition; (b) at least one structurant selected from the group consisting of glucose, liquid glucose, galactose, xylose, lactose, maltose, maltodextrin, trehalose, milk solids, non-diary creamers, and combinations thereof, having a weight percentage in a range of 10-40% with respect to the aerated beverage composition; (c) at least one sweetener selected from the group consisting of sucrose, fructose, liquid fructose, sorbitol, mannitol, dextrose, maltitol, artificial sweetener, and combinations thereof, having a weight percentage in a range of 21-60% with respect to the aerated beverage composition; and (d) at least one solvent selected from the group consisting of water, milk, dissolved milk solids, dissolved non-dairy milk solids, and combinations thereof having a weight percentage in a range of 10-30% with respect to the aerated beverage composition, in such a way that the viscosity of the aerated beverage composition is maintained in a range of 10,000-3,40,000 cps, and the density of the aerated beverage composition is maintained in a range of 0.1-0.99 g/cm$^3$.

In one implementation of the present disclosure, the aerated beverage composition comprises: (a) coffee having a weight percentage in a range of 0.1 to 20% with respect to the aerated beverage composition; (b) at least one structurant selected from the group consisting of glucose, liquid glucose, galactose, xylose, lactose, maltose, maltodextrin, trehalose, milk solids, non-diary creamers, and combinations thereof, having a weight percentage in a range of 10-40% with respect to the aerated beverage composition; (c) at least one sweetener selected from the group consisting of sucrose, fructose, liquid fructose, sorbitol, mannitol, dextrose, artificial sweetener, and combinations thereof, having a weight percentage in a range of 21-60% with respect to the aerated beverage composition; (d) at least one solvent selected from the group consisting of water, milk, dissolved milk solids, dissolved non-dairy milk solids, and combinations thereof, having a weight percentage in a range 10-30% with respect to the aerated beverage composition, and (e) coffee substitutes selected from the group consisting of chicory, herbal extracts, and combinations thereof, in such a way that the viscosity of the aerated beverage composition is maintained in a range of 10,000-3,40,000 cps, and the density of the aerated beverage composition is maintained in a range of 0.1-0.99 g/cm$^3$.

The aerated beverage composition according to the present disclosure consisting essentially of: (a) coffee having a weight percentage in a range of 0.1-20% with respect to the aerated beverage composition; (b) at least one structurant selected from the group consisting of glucose, liquid glucose, galactose, xylose, lactose, maltose, maltodextrin, trehalose, milk solids, non-diary creamers, and combinations thereof, having a weight percentage in a range of 10-40% with respect to the aerated beverage composition; (c) at least one sweetener selected from the group consisting of sucrose, fructose, liquid fructose, sorbitol, mannitol, dextrose, artificial sweetener, and combinations thereof, having a weight percentage in a range of 21-60% with respect to the aerated beverage composition; and (d) at least one solvent selected from the group consisting of water, milk, dissolved milk solids, dissolved non-dairy milk solids, and combinations thereof, having a weight percentage in a range of 15-30% with respect to the aerated beverage composition, in such a way that the viscosity of the aerated beverage composition is maintained in a range of 10,000-3,40,000 cps, and the density of the aerated beverage composition is maintained in a range of 0.1-0.99 g/cm$^3$.

In one implementation of the present disclosure, the aerated beverage composition consisting essentially of: (a) coffee having a weight percentage in a range of 0.1-19% with respect to the aerated beverage composition; (b) at least one structurant selected from the group consisting of glucose, liquid glucose, galactose, xylose, lactose, maltose, maltodextrin, trehalose, milk solids, non-diary creamers, and combinations thereof, having a weight percentage in a range of 12-39% with respect to the aerated beverage composition; (c) at least one sweetener selected from the group consisting of sucrose, fructose, liquid fructose, sorbitol, mannitol, dextrose, artificial sweetener, and combinations thereof, having a weight percentage in a range of 23-57% with respect to the aerated beverage composition; and (d) at least one solvent selected from the group consisting of water, milk, dissolved milk solids, dissolved non-dairy milk solids, and combinations thereof, having a weight percentage in a range of 15-30% with respect to the aerated beverage composition, in such a way that the viscosity of the aerated beverage composition is maintained in a range of 30,000-3,20,000 cps, and density of the aerated beverage composition is maintained in a range of 0.2-0.95 g/cm$^3$.

In another implementation of the present disclosure, the aerated beverage composition consisting essentially of: (a) coffee having a weight percentage in a range of 0.2-16% with respect to the aerated beverage composition; (b) at least one structurant selected from the group consisting of glucose, liquid glucose, galactose, xylose, lactose, maltose, maltodextrin, trehalose, milk solids, non-diary creamers, and combinations thereof, having a weight percentage in a range of 14-39% with respect to the aerated beverage composition; (c) at least one sweetener selected from the group consisting of sucrose, fructose, liquid fructose, sorbitol, mannitol, dextrose, artificial sweetener, and combinations thereof, having a weight percentage in a range of 28-40% with respect to the aerated beverage composition; and (d) at least one solvent selected from the group consisting of water, milk, dissolved milk solids, dissolved non-dairy milk solids, and combinations thereof, having a weight percentage in a range of 15-30% with respect to the aerated beverage composition, in such a way that the viscosity of the aerated beverage composition is maintained in a range of 40,000-3,00,000 cps, and the density of the aerated beverage composition is maintained in a range of 0.3-0.8 g/cm$^3$.

In one implementation of the present disclosure, the aerated beverage composition consisting essentially of: of: (a) coffee having a weight percentage in a range of 0.1-20% with respect to the aerated beverage composition; (b) at least one structurant selected from the group consisting of glucose, liquid glucose, galactose, xylose, lactose, maltose, maltodextrin, trehalose, milk solids, non-diary creamers, and combinations thereof, having a weight percentage in a range of 10-40% with respect to the aerated beverage composition; (c) at least one sweetener selected from the group consisting of sucrose, fructose, liquid fructose, sorbitol, mannitol, dextrose, artificial sweetener, and combinations thereof, having a weight percentage in a range of 21-60% with respect to the aerated beverage composition; (d) at least one solvent selected from the group consisting of water, milk, dissolved milk solids, dissolved non-dairy milk solids, and combinations thereof, having a weight percentage in a range of 10-30% with respect to the aerated beverage composition, and (e) coffee substitutes selected from the group consisting of chicory, herbal extracts, and combinations thereof, in such a way that the viscosity of the aerated beverage composition is maintained in a range of 40,000-3,00,000 cps, and the density of the aerated beverage composition is maintained in a range of 0.3-0.8 g/cm³.

According to the present disclosure, the temperature stability of the aerated beverage composition is directly dependent on the weight ratio of the liquid component to the solid component. Thus, the state in which the structurant or sweetener is added into the composition impacts the stability of the aerated beverage composition. Therefore, the weight ratio of the liquid component to the solid component. is critical for arriving at the aerated beverage composition of the present disclosure which is stable at varying temperature. The solid component of the aerated beverage composition of the present disclosure is obtained by combining the coffee, the at least one structurant, the at least one sweetener, and the liquid component is referred to as at least one solvent and at least one structurant. In another implementation of the present disclosure, the coffee can be a liquid component (liquid form) or a solid component (solid form). The liquid component of the aerated beverage composition can be: (i) solvent alone; or (ii) solvent and coffee; or (iii) solvent and structurant; or (iv) solvent and sweetener; or (v) solvent, and sweetener, and structurant. The structurant can be in a liquid form or a solid form, similarly, the sweetener can also be in a liquid form or a solid form. It is evident that the solvent is always in a liquid form.

According to the aerated beverage composition of the present disclosure, the coffee, the at least one structurant selected from the group consisting of glucose, glucitol, isomalt, galactose, xylose, lactose, maltose, maltodextrin, trehalose, milk solids, non-diary creamers, and combinations thereof, and the at least one sweetener selected from the group consisting of sucrose, fructose, sorbitol, mannitol, dextrose, artificial sweetener, and combinations thereof combines to form a solid component, and the at least one solvent selected from the group consisting of water, milk, dissolved milk solids, dissolved non-dairy milk solids, and combinations thereof, the at least one structurant is a liquid glucose, and the at least one sweetener is liquid fructose forms a liquid component. The weight ratio of the liquid component to the solid component can be in a range of 1:2.3-1:9. The weight ratio values can be further varied within the broad range. Thus, in certain non-limiting examples, the weight ratio of the liquid component to the solid component can be in the range of 1:2.4-1:8, or 1:3-1:7, or 1:3.3-1:5. The presence of the liquid to the solid component in the weight ratio range of 1:2.3-1:9 is critical for arriving at the stable aerated beverage composition which helps to deliver a stable, frothy, creamy coffee with the desired texture, color, taste, and with no separation of ingredients.

In one implementation of the present disclosure, the aerated beverage composition is stable for a period of more than 48 hours. In another implementation of the present disclosure, the aerated beverage composition of the present disclosure can be stable for a period in a range of 48 hours-12 months. In yet another implementation of the present disclosure, the aerated beverage composition is stable for 50 hours, or 72 hours, or 48 hours. In one another implementation of the present disclosure, the aerated beverage composition can be stable for 6 days, or 12 days, or 24 days, or 36 days, or 50 days, or 100 days, or 200 days, or 360 days. The aerated beverage composition as described herein is stable at a temperature in a range of 4-15° C. for a time period in a range of 48 hours-12 months, or 48 hours-11 months, or 1 month-12 months, or 1 month-11 months, or 1 month-10 months, or 1 month-9 months, or 1 month-8 months, or 48 hours-10 months, or 72 hours-10 months, or 4 months-12 months.

According to the present disclosure, the aerated beverage composition is stable at temperature in a range of 4-25° C.

In certain non-limiting examples of the present disclosure, the aerated beverage composition can be stable at a temperature of 4° C., or, 5° C., or 6° C., or 7° C., or 8° C., or 9° C., or 10° C., or 11° C., or 12° C., or 13° C., or 14° C., or 15° C., or 20° C., or 22° C., or 25. In another implementation of the present disclosure, the aerated beverage composition is stable at temperature in a range of 16-25° C., or 12-25° C., or 20-25° C., or 4-20° C., or 6-23° C. The aerated beverage composition as described herein is stable at a temperature in a range of 4-25° C. for a time period in a range of 48 hours-12 months, or 48 hours-11 months, or 1 month-12 months, or 1 month-11 months, or 1 month-10 months, or 1 month-9 months, or 1 month-8 months, or 48 hours-10 months, or 72 hours-10 months, or 4 months-12 months.

In the present disclosure, the aeration composition as described herein, further comprising monosaccharide, or oligosaccharide, or polysaccharide, or combinations thereof to disaccharide, in a range of 1:5 to 1:0.3 is important for minimizing the recrystallization of sugars. Examples of monosaccharides is selected from a group consisting of glucose, fructose, galactose, xylose, rhamnose, arabinose, dextrose, mannose, and combinations thereof. The aerated composition can also include monosaccharide derivative which can be sorbitol, mannitol and combinations thereof, Examples of oligosaccharide includes isomalt, galactooligosaccharide, fructooligosaccharide, glucooligosaccharide, xylooligosaccharide, rhamnooligosaccharide, arabinoligosaccharide, mannoligosaccharide, and combinations thereof, and the polysaccharide can be maltodextrin, dextrin, gums and their derivatives, and combinations thereof. In certain non-limiting examples of the present disclosure, the weight ratio of monosaccharide, or oligosaccharide, or polysaccharide, or combinations thereof to disaccharide can be 1:4, 1:3, 1:2, 1:1, 1:0.5, 1:0.3.

The aerated beverage composition consisting essentially of: (a) a solid component comprising: (i) coffee having a weight percentage in a range of 0.1-20% with respect to the aerated beverage composition; (ii) at least one structurant selected from the group consisting of glucose, liquid glucose, galactose, xylose, lactose, maltose, maltodextrin, trehalose, milk solids, non-diary creamers, and combinations thereof, having a weight percentage in a range of 10-40% with respect to the aerated beverage composition; (iii) at least one sweetener selected from the group consisting of sucrose, fructose, liquid fructose, sorbitol, mannitol, dextrose, artificial sweetener, and combinations thereof, having a weight percentage in a range of 21-60% with respect to the aerated beverage composition; and (b) a liquid component comprising the at least one solvent selected from the group consisting of water, milk, dissolved milk solids, dissolved non-dairy milk solids, and combinations thereof, having a weight percentage in a range of 15-30% with respect to the aerated beverage composition, such a way that the weight ratio of the liquid component to solid component is maintained in a range of 1:2.3-1:8. The weight ratio values can be further varied within the broad range. Thus, in certain non-limiting examples, the weight ratio of the liquid component to the solid component can be in the range of 1:2.4-1:8, or 1:3-1:7, or 1:3.3-1:5. According to the present disclosure, the viscosity of the aerated beverage composition is maintained in a range of 10,000-3,40,000 cps, and the density of the aerated beverage composition is maintained in a range of 0.1-0.99 g/cm³. In one implementation of the present disclosure, the weight ratio of the liquid component to the solid component is 1:2.3.

The process of preparing the aerated beverage composition as per the present disclosure comprises: contacting coffee, the at least one structurant, the at least one sweetener, and the at least one solvent, to obtain the aerated beverage composition.

In one implementation of the present disclosure, the process of preparing the aerated beverage described as per the present disclosure comprises: (i) contacting the coffee, and the at least one solvent at a temperature in a range of 45-80° C., to obtain a first mixture; (ii) contacting the at least one sweetener and the at least one structurant to the at least one solvent at a temperature in a range of 85-125° C., to obtain a second mixture; and (iii) contacting the first mixture to the second mixture with continuous aeration, to obtain the aerated beverage composition.

In one of the implementations of the present disclosure, the temperature range for contacting the coffee and the at least one solvent can be 50-80° C., or 55-75° C., or 58-72° C., or 60-70° C. The temperature range for contacting the at least one sweetener and the at least one structurant can be 88-122° C., 90-120° C., 85-115° C., 90-100° C. The temperature of the processing steps can be adjusted as per the requirements by a person skilled in the art, provided the disclosed range is satisfied. The solvent can be any one or a combination of water, milk, dissolved milk solids, dissolved non-dairy milk solids, and combinations thereof. The at least one sweetener can be sucrose, fructose, liquid fructose, sorbitol, mannitol, dextrose, artificial sweetener, and combination thereof. The at least one structurant can be any one or a combination of glucose, liquid glucose, galactose, xylose, lactose, maltose, maltodextrin, trehalose, milk solids, non-diary creamers. It is contemplated that a person skilled in the art can use any combination of the structurant and the sweetener provided the combined weight percentage of the sweetener falls within the range of 10-40% with respect to the aerated beverage composition, and the combined weight percentage of the structurant falls within the range of 21-60% with respect to the aerated beverage composition.

The present disclosure also provides a process for preparing the aerated beverage composition consisting essentially of coffee, at least one structurant, at least one sweetener, at least one solvent, said process comprising contacting coffee, the at least one structurant, the at least one sweetener, and the at least one solvent, to obtain the aerated beverage composition.

All the ingredients as essentially consisted of the aerated beverage composition as described herein are contacted with each other in a fixed weight percentage range which is with respect to the aerated beverage composition as obtained by the process disclosed herein. For instant, coffee can be present in a weight percentage range of 0.1-20% with respect to the aerated beverage composition, at least one structurant can be present in a weight percentage range of 10-40% with respect to the aerated beverage composition, at least one sweetener can be present in a weight percentage range of 21-60% with respect to the aerated beverage composition, and at least solvent can be present in a weight percentage in a range of 10-30% with respect to the aerated beverage composition.

In one implementation of the present disclosure, the process of preparing the aerated beverage consisting essentially of: (a) coffee having a weight percentage in a range of 0.1-20% with respect to the aerated beverage composition; (b) at least one structurant selected from a group consisting of glucose, liquid glucose, galactose, xylose, lactose, maltose, maltodextrin, trehalose, milk solids, non-diary creamers, and combinations thereof, having a weight percentage in a range of 10-40% with respect to the aerated beverage composition; (c) at least one sweetener selected from a group consisting of sucrose, fructose, liquid fructose, sorbitol, mannitol, dextrose, artificial sweetener, and combinations thereof, having a weight percentage in a range of 21-60% with respect to the aerated beverage composition; and (d) at least one solvent selected from a group consisting of water, milk, dissolved milk solids, dissolved non-dairy milk solids, and combinations thereof, having a weight percentage in a range of 15-30% with respect to the aerated beverage composition, said process comprises: (i) contacting the coffee, and the at least one solvent at a temperature in a range of 45-80° C., to obtain a first mixture; (ii) contacting the at least one sweetener and the at least one structurant to the at least one solvent at a temperature in a range of 85-125° C., to obtain a second mixture; and (iii) contacting the first mixture to the second mixture with continuous aeration, to obtain the aerated beverage composition. According to the present disclosure, the aerated beverage composition obtained by the process as described herein, has a viscosity in a range of 10,000-3,40,000 cps, and density in a range of 0.1-0.99 g/cm$^3$.

The present disclosure also provides a read-to-drink beverage. The ready-to-beverage comprises: (a) the aerated beverage composition, said aerated beverage composition comprising: (i) coffee having a weight percentage in a range of 0.1 to 20% with respect to the aerated beverage composition; (ii) at least one structurant having a weight percentage in a range of 10-40% with respect to the aerated beverage composition; (iii) at least one sweetener having a weight percentage in a range of 21-60% with respect to the aerated beverage composition; and (iv) at least one solvent, in such a way that the viscosity is maintained in a range of 10,000-3,40,000 cps; and (b) at least one diluent. In an example, the diluent can be either water or milk. In one implementation of the present disclosure, the ready-to-drink beverage is having a weight by volume ratio of the aerated beverage composition and the at least one diluent in a range of 1:30 to 1:10. In another implementation of the present disclosure, the weight by volume ratio of the aerated beverage composition and the at least one diluent can be in a range of 1:25-1:12, or 1:20-1:15, or 1:22-1:18.

In one implementation of the present disclosure, the ready-to-drink beverage is prepared by reconstituting the aerated beverage composition in the at least one diluent. The diluent can be either water or milk.

According to the present disclosure, the reconstituting is done by contacting the aerated beverage composition to at least one diluent in a weight by volume ratio range of 1:30 to 1:10 to obtain the ready-to-drink beverage. The weight by volume ratio of the aerated beverage composition and the at least one diluent can be in a range of 1:25:1:12, or 1:20 to 1:15, 1:18:1:15.

As per another implementation, the reconstituting of the aerated beverage composition is done by (i) obtaining the aerated beverage composition in a range of 5-15 grams; and (ii) contacting the aerated beverage composition to at least one diluent in a range of 100-150 ml, to obtain the ready-to-drink beverage. The aerated beverage reconstituted can be 5 grams, or 6 grams, or 7 grams, or 8 grams, or 9 grams, or 10 grams, or 11 grams, or 12 grams, or 13 grams, or 14 grams, or 15 grams. The at least one diluent is either milk or water, or combinations thereof. In one example, the at least one diluent is water. In another example, the at least diluent is milk. The at least one diluent has a temperature in a range of 4–95° C., or 10-90° C., or 15-85° C., or 25-65° C., or 30-50° C., or 35-45° C. The at least one diluent can be water or milk or combinations thereof. It can be contemplated that the diluent can be a mixture of dissolved milk solids for reconstituting the aerated beverage composition.

The ready-to-drink beverage as described in the present disclosure can have a varying level of froth. It can be contemplated that the level of froth also depends upon the volume, type, and temperature of the diluent used to reconstitute the aerated beverage composition of the present disclosure. In one implementation of the present disclosure, upon reconstituting 5-15 grams of the aerated beverage composition with 100-150 ml of the diluent (milk or water) having a temperature in a range of 4-95° C., the ready-to-drink beverage has a froth level in a range of 7-12 mm that is achieved without using any external process like shaking and artificial means of creating froth. The said froth level is achieved by simple mixing of the components to achieve a homogenous ready-to-drink beverage. The ready-to-drink beverage may have higher froth also depending on the volumes reconstituted. The range of 7-12 mm is with respect to the normal volumes used to achieve a cup of ready-to-drink beverage. Sub-ranges within this broad range are also intended to be falling within the scope of the disclosure. Thus, in certain non-limiting examples, the ready-to-drink beverage has a froth level in a range of 8-11 mm or 9-11 mm.

In one implementation of the present disclosure, the ready-to-drink is obtained by reconstituting the aerated beverage consisting essentially of: (a) coffee having a weight percentage in a range of 0.1-20% with respect to the aerated beverage composition; (b) at least one structurant selected from the group consisting of glucose, liquid glucose, galactose, xylose, lactose, maltose, maltodextrin, trehalose, milk solids, non-diary creamers, and combinations thereof, having a weight percentage in a range of 10-40% with respect to the aerated beverage composition; (c) at least one sweetener selected from the group consisting of sucrose, fructose, liquid fructose, sorbitol, mannitol, dextrose, artificial sweetener, and combinations thereof, having a weight percentage in a range of 21-60% with respect to the aerated beverage composition; and at least one solvent selected from the group consisting of water, milk, dissolved milk solids, dissolved non-dairy milk solids, and combinations thereof, having a weight percentage in a range of 10-30% with respect to the aerated beverage composition, in such a way that the viscosity of the aerated beverage composition is maintained in a range of 10,000-3,40,000 cps, density is maintained in a range of 0.1-0.99 g/cm$^3$.

The reconstituting is done by contacting the aerated beverage composition to at least one diluent in weight by volume ratio range of 1:30 to 1:10 to obtain the ready-to-drink beverage.

According to the present disclosure, the reconstituting is done by: (i) obtaining the aerated beverage composition in a range of 5-15 grams; and (ii) contacting the aerated beverage composition to at least one diluent in a range of 100-150 ml, to obtain the ready-to-drink beverage. The at least one diluent is either milk or water, or combinations thereof. In one example, the at least one diluent is water. In another example, the at least diluent is milk. The at least one diluent has a temperature in a range of 4-95° C.

Without using any special equipment or without requiring any special skills for mixing the ingredients to obtain a ready-to-drink beverage, the present disclosure provides a simple process of obtaining a read-to drink beverage that has a froth level in a range of 7-12 mm. The level of the froth obtained on the surface of the ready-to-drink (end cup) depends on the weight percentage of the ingredients, such as coffee in a weight percentage range of 0.1-20% with respect to the aerated beverage composition, at least one structurant in a weight percentage range of 10-40% with respect to the aerated beverage composition, at least one solvent in a weight percentage range of 10-30% with respect to the aerated beverage composition, essentially consisted in the aerated beverage composition. Moreover, the level of the froth also depends on the temperature, volume, and type of the diluent used for reconstituting the aerated beverage composition of the present to obtain the ready-to-drink beverage.

In one implementation of the present disclosure, there is provided an aerated beverage composition as described herein, for use in obtaining a ready-to-drink beverage.

Although the subject matter has been described in considerable detail with reference to certain examples and implementations thereof, other implementations are possible.

In the present disclosure, other ingredients that can be optionally added to the aerated beverage composition can be listed. The aerated beverage composition may further include additional optional ingredients in solid or liquid form, such as but not limited to preservatives, natural or artificial flavors, non-nutritive sweeteners, buffers, salts, nutrients, surfactants, emulsifiers, stimulants, antioxidants, preservatives, crystallization inhibitors, natural or artificial colors, viscosifiers, antioxidants, caffeine, electrolytes (including salts), nutrients (e.g., vitamins and minerals), stabilizers, gums, and the like. Preservatives, such as EDTA, sodium benzoate, potassium sorbate, sodium hexametaphosphate, raisin, natamycin, polylysine, and the like can be included, if desired. For example, benzoate and/or sorbate salts may also be included, if desired. Generally, benzoate and/or sorbate salts could be included in amounts of up to about 0.1 percent each. Other non-coffee and non-tea solid flavor sources may also be used, such as cinnamon bark, ginger root, clove buds, cardamom pods, rosemary needles, orange peels, hibiscus, chamomile, or rose flowers, lemongrass stalks, cocoa nibs, yerba mate, chicory, and other seeds, roots, flowers, twigs, stalks, barks, pods, buds, peels, needles, and combinations thereof. Other immunity boosting ingredients such as *ginseng*, spices selected from turmeric, cinnamon, black pepper, clove, ginger; plant extracts, aloe and combinations thereof.

The aerated beverage composition of the present disclosure may be packaged and dispensed in any manner, such as from a bottle or other multi-serve container, from a single-serve pod or capsule, from a bulk package such as a bag-in-box container, or from a vending machine. Pre-measured bags or envelopes appropriately sized for addition to standard hot-water urns or other foodservice devices may be produced to improve user convenience and better control of beverage strength. Two or more packaged formulations may be dispensed together, in any suitable manner, to prepare a single beverage or other food product.

Further, for example, a foodservice operator could prepare a ready-to-mix coffee formulation of the present disclosure using a soluble coffee powder, at least one structurant, at least one sweetener, and solvent to provide a convenient form of coffee that can be easily dispensed from a container or vending machine over the course of a dining event, a weekend event, or a week-long event without producing substantial loss of flavor quality or sedimentation during that time.

Similarly, the aerated beverage composition of the present disclosure can be further processed in methods known to a person skilled in the art. For example, the aerated beverage composition of the present disclosure can be suitably dried to remove its moisture content and convert it in to a powder or granule. Similarly, the aerated beverage composition of the present disclosure can be processed with foaming agents, propellants and converted into coffee aerosol creams. Again, the aerated beverage composition of the present disclosure can be added to condensed milks and ice-cream mixes to be converted to coffee smoothies, shakes, ice-creams. Formulations as may be produced by such further processing procedures are deemed to be a part of the present disclosure.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may apply.

The working and non-working examples as depicted in the forthcoming section demonstrates the benefits provided by the aerated beverage composition comprising coffee having a weight percentage in a range of 0.1 to 20% with respect to the aerated beverage composition; the at least one structurant having a weight percentage in a range of 10-40% with respect to the aerated beverage composition; the at least one sweetener having a weight percentage in a range of 21-60% with respect to the aerated beverage composition; and the at least one solvent. The aerated beverage composition has a viscosity in a range of 10,000-3,40,000 cps. The examples further highlight the criticality of the presence of coffee, at least one structurant, at least one sweetener, and solvent in the disclosed weight percentage ranges for arriving at the aerated beverage composition of the present disclosure. The absence of any of the ingredients specified above or their presence beyond the specific weight percentage ranges as disclosed herein substantially affects the texture and flavor of the coffee and further fails to deliver a creamy and frothy cup of ready-to-drink coffee. The examples further demonstrate that the presence of liquid component to the solid component in the weight ratio range of 1:2.3 to 1:9 is critical so as to achieve an aerated beverage composition which is stable and has a shelf life for a period in a range of 48 hours to 12 months, without compromising on its color and texture over a period of time.

In an example, liquid glucose has a brix value of 82. In another example, fructose syrup has a brix value of 67. It can be contemplated that the aerated beverage composition of the present disclosure is intended to include liquid glucose, fructose syrup having any Brix value as one of its implementations as long as the composition satisfies the liquid to solid weight ratio as disclosed herein. Likewise, the aerated beverage composition can include other structurant and/or sweetener as a liquid component having any Brix value.

The total water content of the aerated beverage composition includes the sum of the water inherently present in the ingredients added along with the water added as a solvent in the following examples. For instance, in working example 1, if X % of water is present inherently in the liquid glucose, then it can be contemplated that the total water content present in the aerated beverage composition would be sum of X % of water inherently present in liquid glucose and weight percentage of water added externally to the composition.

In the following examples, "WE" refers to Working Examples, and "NWE" refers to the Non-Working Examples.

Example 1

Aerated Coffee Compositions

The present example provides various aerated beverage compositions (Working Examples "WE" and Non-working Examples "NWE"). The example highlights the criticality of the presence of the ingredients, namely coffee, at least one structurant, at least one sweetener, and at least one solvent, in the disclosed weight percentage ranges so as to arrive at the aerated beverage composition of the present disclosure. In particular, the example illustrates the consumer panel data obtained by assessing the ready-to-drink coffee prepared from the aerated beverage compositions. The respective aerated beverage compositions were assessed on the parameters like absence of phase separation, and absence of granular texture, whereas the ready-to-drink coffee prepared from the respective aerated beverage compositions were assessed on the sensorial parameters of creaminess, frothiness (presence of 7-12 mm froth), foaming, mouth-feel, taste (sweet or bitter), overall texture, and viscosity. The viscosity and the density of the aerated beverage composition was calculated at 25° C.

Table 1 depicts the working and non-working examples with respect to the weight percentages of the ingredients used for preparing aerated beverage compositions, as disclosed in the present disclosure.

TABLE 1

| INGREDIENTS (wt. %) | | WE 1 | WE 1 (A) | NWE 1 | NWE 2 | NWE 3 |
|---|---|---|---|---|---|---|
| | Coffee | 15 | 20 | 15 | 15 | 19.8 |
| Solvent | Water | 21 | 20 | 21 | 21 | 25 |
| Structurant | Liquid Glucose | 25 | 0 | 0 | 64 | 0 |
| Sweetener | Sucrose | 39 | 40 | 64 | 0 | 55 |
| Structurant | Maltodextrin | 0 | 20 | 0 | 0 | 0 |
| | Carrageenan/ Gum Arabica/ guar gum/ pectin | 0 | 0 | 0 | 0 | 0.2 |
| | Total | 100 | 100 | 100 | 100 | 100 |
| | Density (g/Cc) | 0.65 | 0.5 | 0.35 | 0.5 | 0.2 |
| | Viscosity (Cps) | 172000 | 150000 | 210000 | 181000 | 127000 |
| | OBSERVATIONS | Good creaminess observed | Good creaminess observed | Froth retention time less than 5 minutes | Creaminess not seen | Creaminess reduced |
| | | Balanced Sweetness and Coffee Mouth feel after taste | Balanced Sweetness and Coffee Mouth feel after taste | Foam quality of aerated composition compromised and weak structure stability at heat stability @ >25° C. | Bitterness perceived | Foam quality of soft mix compromised |

TABLE 1-continued

| INGREDIENTS (wt. %) | WE 1 | WE 1 (A) | NWE 1 | NWE 2 | NWE 3 |
|---|---|---|---|---|---|
| | No separation observed | No separation observed | Separation observed | Too thick viscous mass formed | Less froth |
| | No Granular texture obtained | No Granular texture obtained | Granular texture/ crystals found over the time | No froth | Foam quality of aerated composition compromised and weak structure stability over the time like quick color change and phase separation |
| | 7-12 mm froth observed after reconstitution with milk/water | 7-12 mm froth observed after reconstitution with milk/water | 7-12 mm froth observed after reconstitution with milk/water | <7 mm froth observed after reconstitution with milk/water | Thick viscous mass formed |

As shown in Table 1, various ingredients in different weight percentages are disclosed for each aerated beverage compositions of the working examples: (WE 1), and WE 1 (A), and non-working examples: (NWE 1 to NWE 3). The aerated beverage compositions of each example were further assessed for their sensorial properties by the consumer panel on drinking the ready-to-drink coffee prepared from the said aerated beverage compositions as listed therein. The viscosity and density values for each of the compositions were also measured.

In case of working example 1 (WE 1), the weight percentages of coffee, water, liquid glucose, and sucrose were 15%, 21%, 25%, and 39%, respectively. The weight percentage values of coffee, water, liquid glucose, sucrose of aerated beverage composition of WE 1 were within the weight percentage range of coffee (0.1-20%), water (10-30%), liquid glucose (10-40%), and sucrose (21-60%), respectively, of the composition of the present disclosure. The viscosity of the composition was 172000 cps, and the density was 0.65 g/cc, wherein both the viscosity and density values were falling within the disclosed ranges of the present disclosure. The aerated composition of WE 1 was further assessed by the panelist on various parameters, such as separation of ingredients, granules formation, taste, viscosity. The coffee prepared from said composition of WE 1 were further assessed on the creaminess, mouth-feel, froth level, and overall texture. It was observed that the ingredients that were combined in the weight percentages, as disclosed in the present disclosure, imparted good creaminess characteristics to the coffee made with the aerated composition of WE 1. Also, a froth level in a range of 7-12 mm was observed in the coffee after reconstituting coffee with either water or milk. Further, no separation of ingredients was observed in the aerated composition. Moreover, the composition exhibited balanced color, sweetness, texture, and taste. Therefore, the composition of WE 1 is the working composition that provided a stable coffee with desired taste, froth and foam.

In case of WE 1(A), maltodextrin was used as a structurant in the composition. The composition comprised coffee, water, sucrose, maltodextrin in the weight percentage of 20%, 20%, 40%, and 20%, respectively, which were falling within the disclosed weight percentage ranges of the present disclosure. The viscosity and density values of the composition were 150000 cps, and 0.5 g/cc, respectively. When the aerated composition was assessed by the panelists, it was observed that there was no separation of ingredients and no granular texture was obtained. The taste of the coffee drink in term of the sweetness of the composition was also balanced. The composition of WE 1(A) when reconstituted with either water of milk, delivered a coffee with good creaminess, taste, and froth level in a range of 7-12 mm was observed. Therefore, the composition of WE 1(A) is the working composition with all the ingredients having weight percentages falling within the disclosed ranges, and that provided a stable coffee with desired taste, cream, froth and foam.

In case of non-working example 1 (NWE 1), the ingredients used for preparing the aerated composition were coffee with a weight percentage of 15%, water with a weight percentage of 21%, and sucrose with a weight percentage of 64%. The weight percentages of coffee and water were within the weight percentage range of coffee (0.1-20%), and water (10-30%), respectively, as disclosed in the present disclosure. However, due to the absence of liquid glucose (structurant) and the presence of sucrose with weight percentage (64%) falling outside the disclosed weight percentage range (21-60%), the composition of NWE 1 failed to deliver a creamy, and textured coffee drink with desired mouthfeel. Even though the viscosity and density values were falling within the ranges, however, a separation of ingredients was observed, and granular texture or crystals were found in the composition with a period of time. Moreover, the foam quality of the aerated composition of NWE 1 was compromised and the composition exhibited a weak structure stability at a temperature more than 25° C. Hence, this shows that the composition was not stable temperature greater than 25° C. When such a composition was reconstituted with either water or milk, the coffee was obtained with a froth retention time of less than 5 minutes. Thus, it can be inferred that the presence of structurants like liquid glucose and presence of sweetener in the disclosed weight percentage range along with other ingredients like coffee and water is crucial for achieving the aerated composition to provide a stable, creamy, frothy, textured coffee with the desired mouthfeel and taste.

The non-working example 2 (NWE 2) highlights the criticality of the presence of sucrose (sweetener) along with other ingredients like coffee, water, and liquid glucose in the aerated composition. Referring to Table 1, the weight percentages of coffee (15%) and water (21%) were within the weight percentage ranges of 0.1-20% and 10-30%, respectively, as disclosed in the present disclosure. Further, sucrose (a sweetener) was absent, and the weight percentage of glucose i.e., 64% was falling outside the disclosed weight percentage range of structurant (10-40%) of the present disclosure. Therefore, due to the absence of sweetener and presence of structurant like liquid glucose outside their working range (10-40%) as disclosed in the present disclosure, the composition of NWE 2 failed to deliver a creamy and foamable coffee drink with the desired mouthfeel. Further, the panelists observed the formation of a thick viscous mass on the surface of the coffee, therefore, making the coffee undesirable for drinking. The taste of the coffee was bitter in taste. Further, no froth was observed on the surface of the coffee on reconstituting the composition with either water or milk. Therefore, composition of NWE 2 is the non-working composition that failed to deliver a coffee with desired froth and cream.

The Non-Working Example 3 (NWE 3) shows the effect of the presence of additional ingredients like carrageenan, gum, *arabica*, pectin in the stability of the composition used for preparing coffee. The NWE 3 shows that while adding additional ingredients like carrageenan or gum *arabica*, or guar gum, or pectin along with coffee, water, sucrose, the composition achieved was highly unstable. Further, liquid glucose was absent in the composition. Due to the absence of structurant, the composition exhibited weak structure stability over the time with a quick change in color and separation of ingredients into phases. Moreover, the foam quality of the composition was also compromised. When such a composition was reconstituted with water or milk, a thick viscous mass was formed on the surface of the coffee, and the texture, taste, and foam quality of the coffee was also highly affected.

Working Aerated Beverage Compositions

Table 2 shows the working examples WE 2 to WE 8 that comprises coffee, water, liquid glucose, sucrose with desired weight percentages that fall with the ranges as disclosed herein. All ingredients are combined in different weight percentages so as to arrive at different aerated beverage compositions.

TABLE 2

| | INGREDIENTS | WE 2 | WE 3 | WE 4 | WE5 | WE 6 | WE 7 | WE 8 |
|---|---|---|---|---|---|---|---|---|
| | Coffee | 15 | 10 | 0.2 | 5 | 2 | 5 | 10 |
| Solvent | Water | 20 | 21 | 20 | 25 | 18 | 15 | 22 |
| Structurant | Liquid Glucose | 25 | 29 | 12 | 20 | 28 | 30 | 18 |
| Sweetener | Sucrose | 35 | 35 | 42 | 45 | 35 | 40 | 44 |
| Structurant | Maltose | 5 | | 25 | | 2 | | |
| Coffee Substitute | *Chicorium* extract (chicory) | | | 0.8 | 5 | | | |
| Sweetener | Liquid Fructose | | | | | | 10 | |
| Solvent | Milk | | | | | | 8 | |
| Sweetener | Sorbitol | | | | | 5 | | 5 |
| Structurant | Non-dairy creamer | | | | | | 2 | |
| Sweetener | Dextrose | | 5 | | | | | |
| Sweetener | Artificial sweetener (Stevia or Saccharin, or aspartame) | | | | | | | 0.5 |
| Sweetener | Mannitol or maltitol | | | | | | | 0.5 |
| | Total | 100 | 100 | 100 | 100 | 100 | 100 | 100 |
| | Density gm/Cc | 0.3 | 0.4 | 0.5 | 0.6 | 0.7 | 0.8 | 0.65 |
| | Viscosity (Cps) | 100000 | 85000 | 90000 | 62000 | 150000 | 225000 | 74000 |
| | OBSERVATIONS | 11 mm Froth No phase separation End cup creaminess and coffee flavor was good Balanced Sweetness and Coffee Mouth feel after taste No Granular texture/crystals found over the time Structural stability found good | 11 mm Froth No phase separation End cup creaminess and coffee flavor was good Balanced Sweetness and Coffee Mouth feel after taste No Granular texture/crystals found over the time Structural stability found good | 10 mm Froth No phase separation End cup creaminess and coffee flavor was good Balanced Sweetness and Coffee Mouth feel after taste No Granular texture/crystals found over the time Structural stability found good | 9 mm Froth No phase separation End cup creaminess and coffee flavor was good Balanced Sweetness and Coffee Mouth feel after taste No Granular texture/crystals found over the time Structural stability found good | 8 mm Froth No phase separation End cup creaminess and coffee flavor was good Balanced Sweetness and Coffee Mouth feel after taste No Granular texture/crystals found over the time Structural stability found good | 7 mm Froth No phase separation End cup creaminess and coffee flavor was good Balanced Sweetness and Coffee Mouth feel after taste No Granular texture/crystals found over the time Structural stability found good | 8 mm Froth No phase separation End cup creaminess and coffee flavor was good Balanced Sweetness and Coffee Mouth feel after taste No Granular texture/crystals found over the time Structural stability found good |

It can be observed from Table 2 that aerated beverage compositions of WE 2 to WE 8 comprise all the essential ingredients like coffee, solvent (water, milk), structurant (liquid glucose, maltose, non-dairy creamers), sweetener (sucrose, liquid fructose, sorbitol, dextrose, artificial sweetener). In the aerated compositions of WE2 to WE 8, all the ingredients, such as coffee, liquid glucose, water, and sucrose were falling within the disclosed ranges. Moreover, the viscosity and density of compositions of all WE 2 to We 8 are also falling within the disclosed ranges. Further, Table 2 also provides a possibility of using a coffee substitute, such as chicory along with other essential ingredients in the aerated beverage composition of WE 4 and WE 5, wherein the weight percentage of chicory in WE 4 and WE 5 was 0.8% and 5%, respectively. Further, it is exemplified that the aerated beverage composition of WE 8 further comprised artificial sweeteners, such as, *stevia* saccharin, aspartame having a combined weight percentage of 0.5%, and mannitol, and maltitol having a combined weight percentage of 0.5%. Overall, it can be observed that all the ingredients, as mentioned in Table 2 are present within the weight percentage ranges as disclosed in the present disclosure. Therefore, no phase separation of ingredients was observed in any of the compositions of WE 2 to WE 8. Moreover, no granular texture as observed in any of the compositions of WE 2 to WE 8. Henceforth, all the compositions of WE 2 to WE 8 were structurally stable. Such compositions, as disclosed in WE 2 to WE 8, when reconstituted with either water or milk, provided a stable coffee drink with desirable sensorial features with a desired froth level in a range of 7-12 mm. The end cup (ready-to-drink coffee) creaminess and overall flavor of the coffee was also remarkable. It may also be understood that in case an aerated composition is prepared without the addition of solvent (water, with or without milk), the composition would be too thick and viscous to process. Hence, such a coffee could not be prepared for assessment. Therefore, it can be appreciated that the absence of any one of the ingredients, such as coffee, solvent, structurant, and sweetener or the presence of any of the above ingredient outside the disclosed weight percentages, fails to deliver a stable, creamy and frothy coffee with the desired texture and sweetness.

Non-Working Aerated Beverage Compositions

Table 3 shows the weight percentages of different ingredients used for arriving at the aerated beverage compositions of the NWE 4 to NWE 9. The coffee drink obtained from the aerated compositions of NWE 4 to NWE 9 were assessed by the panelists for the sensorial parameters with respect to viscosity, texture, taste, color, and stability.

TABLE 3

| INGREDIENTS | | NWE 4 | NWE 5 | NWE 6 | NWE 7 | NWE 8 | NWE 9 |
|---|---|---|---|---|---|---|---|
| | Coffee | 22 | 15 | 10 | 15 | 18 | 5 |
| Solvent | Water | 21 | 9 | 25 | 21 | 37 | 10 |
| Structurant | Liquid Glucose | 25 | 21 | 55 | 9 | 25 | 15 |
| Sweetener | Sucrose | 32 | 55 | 10 | 55 | 20 | 70 |
| Total | | 100 | 100 | 100 | 100 | 100 | 100 |
| Density gm/Cc | | 0.3 | 0.4 | 0.5 | 0.6 | 0.7 | 0.8 |
| Viscosity (Cps) | | 100000 | 300000 | 425000 | 62000 | 150000 | 225000 |
| OBSERVATIONS | | 11 mm Froth Bitter taste | 8 mm Froth Hard to scoop | 4 mm Froth Phase separation observed | 6 mm Froth Phase separation observed | 5 mm Froth Phase separation observed | 5 mm Froth Phase separation observed |
| | | End cup low creaminess | End cup low creaminess and bitter taste | End cup low creaminess and mild coffee taste | End cup low creaminess and bitter taste | No creaminess, after taste and mild bitter taste | Less creaminess, high sweetness and mild coffee flavour |
| | | Sweetness and coffee mouth feel not balanced Granular texture/ crystals found over the time Color variation observed | Sweetness and coffee mouth feel not balanced Granular texture/ crystals found over the time Color variation observed | Sweetness and coffee mouth feel not balanced Granular texture/ crystals found over the time Color variation observed | Sweetness and coffee mouth feel not balanced Granular texture/ crystals found over the time Color variation observed | Sweetness and coffee mouth feel not balanced Granular texture/ crystals found over the time Color variation observed | Sweetness and coffee mouth feel not balanced Granular texture/ crystals found over the time Color variation observed |

Referring to Table 3, in case of NWE 4, it was observed that the weight percentage of coffee (22%) falls outside the disclosed weight percentage (0.1-20%) of the present disclosure. Even though the viscosity and density of the composition are falling within the ranges, however, there was a variation in the color and a formation of the granular texture was also observed. Therefore, the aerated beverage composition was not obtained as the intermediate product was too thick to be able to process completely in order to obtain the ready-to-drink coffee. Moreover, the composition was bitter in taste. Hence, the composition of NWE 4 was not assessed further for the sensorial features by the panelists. Further, in case of NWE 5, the weight percentage of water was 9%, which is lesser than the weight percentage range (10-30%) disclosed in the present disclosure, thereby affecting the scoopability of the composition. Moreover, a formation of crystals and variation in color of the composition was also observed, thereby affecting the stability of the composition of NWE 5. On reconstituting such a composition with either water or milk, the coffee as obtained was bitter in taste and had end-cup low creaminess. Henceforth, the composition of NWE 5 could not be processed further for their sensory analysis by the panelists. In case of NWE 6, the presence of liquid glucose (structurant) in a weight percentage of 55%, falling outside the disclosed weight percentage range (10-40%) makes the composition as a non-working composition. Due to the presence of a structurant at a higher percentage of 55% led to an increase in the viscosity of 425000, which falls outside the disclosed viscosity range (10,000-3,40,000 cps) of the present disclosure. A variation in the color of the composition was also observed along with the formation of granular texture over a period of time. When such a composition with a higher weight percentage of structurant and a higher viscosity, was contacted with either milk or water to prepare coffee, a thick mass was observed. The sweetness and creaminess of the coffee were highly affected. The level of foam was also reduced to 4 mm. Moreover, the foam stability was also deteriorated. In case of NWE 7, it can be observed that the weight percentage of glucose (9%) was outside the disclosed weight percentage range (10-40%) of the present disclosure. Therefore, the aerated composition of NWE 7 was not stable. Even though the viscosity was within the disclosed range, however, phase separation of ingredients was observed along with the change in the color and formation of crystals over the time. Therefore, when such a composition was reconstituted with either water or milk, coffee with end-cup low creaminess was obtained which was also bitter in taste. Further, the sweetness and coffee mouth feel were also not balanced. Moreover, the froth level on the surface of the coffee was of 6 mm, which was outside the disclosed range of froth level (7-12 mm) of the ready-to-drink coffee obtained by the composition of the present disclosure. In case of NWE 8, the water was present in a weight percentage of 37% in the composition, which was higher than the weight percentage range (10-30%) of water as disclosed in the present disclosure. Due to the higher weight percentage of water in the composition, a separation of ingredients into phases were observed along with a variation in the color. When such a composition was reconstituted with either water or milk, the coffee as obtained was not stable as no creaminess was observed, and a low froth of 5 mm was observed. Further, the after-taste of the coffee was also bitter. Henceforth, the sweetness and coffee mouth feel were not balanced, hence not likable by the consumers.

Similar observations were made in the composition of NWE 9 comprises sucrose in a weight percentage of 70%, which also falls outside the disclosed weight percentage range (21-60%) of the sweetener present in the aerated beverage composition of the present disclosure. Moreover, the composition, when reconstituted with either water or milk, delivered a less creamy coffee which was highly sweet in taste, which is not likable by the consumers. The coffee had a froth level of 5 mm which was outside the disclosed froth level (7-12 mm) of the coffee of the present disclosure. Further, the aerated composition of NWE 9 had a granular appearance with a variation in the color.

Overall, it can be observed from Table 1, Table 2, and Table 3, that the presence of coffee, liquid glucose (structurant), sucrose (sweetener), and water (solvent), in their disclosed weight percentage ranges, i.e., 0.1-20%, 10-40%, 21-60%, and 10-30%, respectively, is crucial for arriving at the aerated beverage composition with desired viscosity in a range of 10,000-3,40,000 cps, as disclosed in the present disclosure. The absence or the deviation in the weight percentages of any of the aforementioned ingredients from their disclosed ranges fails to provide a creamy, textured, and frothy coffee, and highly affects the stability of the coffee. Further, it can be contemplated that the addition of ingredients like carrageenan, gum, *arabica*, pectin in composition highly affects the stability and sensorial properties of the aerated beverage composition. Therefore, the aerated composition of the present disclosure avoids the use of any such additional ingredients, which helps in circumventing the problems faced in the literature and provides a stable coffee drink with desired cream, froth, texture, and mouthfeel.

Example 2

Sensory Analysis

Panel data was obtained on the basis of five trained panel members who were asked to evaluate coffee drink (ready-to-drink beverage) prepared from the aerated composition of the present disclosure. Table 4 shows the score matrix based on which the panel data was interpreted.

TABLE 4

| Rating Scale | 1-5 |
|---|---|
| Score Matrix | |
| Not Acceptable | 1 |
| Acceptable | 2 |
| Just Right | 3 |
| Good | 4 |
| Excellent | 5 |

Table 5 and Table 6 show the ratings provided by the panelists on assessing the sensorial attributes of the coffee drink prepared by various aerated beverage compositions of working example 1 and non-working examples 1-9 as described in Example 1. The sensorial attributes, such as, flavor, creaminess, after taste mouthfeel were assessed by the panelists.

TABLE 5

| SENSORIAL PARAMETERS | WE 1 | NWE 1 | NWE 2 | NWE 3 |
|---|---|---|---|---|
| Flavour | 5 | 2 | 2 | 2 |
| Creaminess | 5 | 1 | 1 | 1 |
| After taste mouthfeel | 5 | 2 | 1 | 1 |
| Sweetness | 3 | 1 | 2 | 1 |

TABLE 6

| SENSORIAL PARAMETERS | NWE 4 | NWE 5 | NWE 6 | NWE 7 | NWE 8 | NWE 9 |
|---|---|---|---|---|---|---|
| Flavour | NA | NA | 1 | 2 | 1 | 2 |
| Creaminess | NA | NA | 1 | 1 | 1 | 1 |
| After taste mouthfeel | NA | NA | 1 | 1 | 1 | 1 |
| Sweetness | NA | NA | 1 | 1 | 1 | 1 |

The ratings on the sensorial properties of the coffee drink was given by the panelists on a scale of 5. While the interpretation of the ratings as provided in Table 5 and 6 can be interpreted in accordance with the scoring matrix as provided in Table 4 to clearly understand the final observations made in Table 1 to Table 3. The panel ratings of only one Working Example (i.e., WE 1) is provided herewith, and the observations of all other Working Examples (i.e., WE 1(A), WE 2 to WE 8) are in synchronization with the observations for WE 1.

The composition of WE 1 was given a rating of 5 by the panelists on the all sensorial parameters like flavor, creaminess, after taste mouthfeel, and sweetness. Similarly, the compositions of WE 1(A), WE 2 to WE 8 provide coffee with desired cream, froth, texture, taste, and mouthfeel.

On the contrary, the compositions of NWE 1 to NWE 9 were given a rating of either 1 or 2. Therefore, it can be inferred that the presence of coffee in the weight percentage range of 0.1-20% with respect to the composition, water (solvent) in the weight percentage of 10-30% with respect to the composition, liquid glucose (structurant) in the weight percentage of 10-40% with respect to the composition, and sucrose (sweetener) in the weight percentage of 21-60% with respect to the composition is essential for arriving at the stable aerated beverage composition that delivers the coffee drink with desired cream, froth, texture, taste, and mouthfeel.

Example 3

Liquid Component to Solid Component Ratio

The present example highlights the criticality of the presence of the liquid component to solid component in the weight ratio of 1:2.3-1:9 so as to achieve an aerated beverage composition with stability at a lower temperature without compromising on the color, and its structure over a period of time. The liquid component of the present disclosure can be at least one solvent selected from the group consisting of water, milk, dissolved milk solids, dissolved non-dairy milk solids, and combinations thereof, and the at least one component selected from the group consisting of liquid glucose, and liquid fructose. The solid component can be coffee, the at least one structurant selected from the group consisting of glucose, galactose, xylose, lactose, maltose, maltodextrin, trehalose, milk solids, non-diary creamers, and combinations thereof, and the at least one sweetener selected from the group consisting of sucrose, fructose, sorbitol, mannitol, dextrose, artificial sweetener, and combinations thereof.

Various aerated beverage compositions were formulated as per the weight percentages mentioned in Table 7 below.

TABLE 7

| | | Composition (wt. %) | | | | | |
|---|---|---|---|---|---|---|---|
| Ingredient | | WE 9 | | WE 10 | NWE 10 | NWE 11 | NWE 12 |
| Solid component | *Substrate | 10 | | 5 | 10 | 9 | 5 |
| | Structurant | Milk Solids | 10 | 10 | 0 | 7 | 11 |
| | Structurant | Glucose | 23 | 28 | 0 | 0 | 0 |
| | Sweetener | Sucrose | 20 | 40 | 60 | 49 | 75 |
| | | Fructose | 20 | 0 | 0 | 0 | 0 |
| Liquid component | Water (Solvent) | 17 | | 17 | 30 | 35 | 9 |
| | Total | 100 | | 100 | 100 | 100 | 100 |
| | Density | 0.4 | | 0.78 | 0.2 | 0.2 | 0.82 |
| | Viscosity gm/Cc | 152000 | | 226350 | 10000 | 10000 | Not measurable |
| | Liquid to Solid content | 17:83 1:4.8 | | 17:83 1:4.88 | 30:70 1:2.33 | 35:65 1:1.85 | 9:91 1:10.1 |
| Product Structure Stability at more than 48 hrs at <25° C. | | Stable structure | | Stable structure | Stable product structure at 72 hrs., easy scoopable (Stable at short time) | Granule deposition | Product is too thick to be produced, hence product stability could not be noted. |
| Phase separation | | No | | No | Yes, after 72 hrs | Product separates in to two phases | Yes |
| Color change | | No color change | | No color change | No color change | Color change observed | No color change |
| Froth reduction | | Froth 10 mm height | | Froth 10 mm height | Froth 11 mm height | Froth <7 mm Height | Product not readily soluble hence froth level could not be studied |
| Microbial count | | No Microbial count detected | | No Microbial count detected | No Microbial count detected | No Microbial count detected | Product not readily soluble hence microbial count could not be detected. |

*Substrate is any product suitable for beverage having a caffeine content in the range of 0.1-5% with respect to the substrate.

Referring to Table 7, the solid component comprises substrate (coffee), milk solids and glucose as structurants, sucrose and fructose as sweeteners, and the liquid component comprises water (solvent). In case of composition of WE 9, the weight percentage of coffee, milk solids, glucose, sucrose, fructose, and water, were 10%, 10%, 23%, 20%, 20%, and 17%, respectively, which were falling within the disclosed weight percentage ranges of the present disclosure. The liquid component to the solid component was present in a weight ratio of 1:4.8, which was also falling within the range (1:2.3 to 1:9) as disclosed in the present disclosure. The viscosity (152000 cps) and density (0.4 g/cc) values of the composition were also falling within the disclosed ranges of the present disclosure. Due to the presence of all the ingredients within the disclosed weight percentage ranges and the liquid to solid component weight ratio falling within the disclosed weight ratio range, the composition was stable at even a temperature less than 25° C. for more than 48 hours. No separation of ingredients was observed along with no change in appearance in terms of color of the composition. On reconstituting the composition with either water or milk, a stable coffee was obtained with a froth level of 10 mm. Moreover, no microbial count was detected. Similarly, observations were made in case of the composition of WE 10, wherein all the components, i.e., coffee, milk solids, glucose, sucrose, and water were present at a weight percentage of 5%, 10%, 28%, 40%, and 17%, respectively, falling within the weight percentage ranges as disclosed in the present disclosure. Similarly, the weight ratio of the liquid to solid component was same as the composition of WE 9, i.e. 1:4.88. Therefore, composition of WE 10 was as stable as the composition of WE 9. Since the liquid to solid component weight ratio in all three compositions of WE 9 (1:4.8) and WE 10 (1:4.88) fall within the weight ratio range 1:2.3 to 1:9 as disclosed in the present disclosure, therefore, the compositions of WE 9 and WE 10 are considered as the working compositions.

In case of the composition of NWE 10, due to the absence of any structurant, such as, glucose or milk solids, the composition was not stable after 72° C. After 72° C., the stability of the composition decreased to such an extent that it affected the scoopability of the composition. Moreover, the ingredients separated into two phases after 72° C. Therefore, the presence of the structurant is very essential for arriving at the composition which is stable and is easily scoopable. Considering this, the composition of NWE 10 is a non-working composition.

Further, the composition of NWE 11 comprised coffee, milk solids, sucrose, and water with weight percentage of 9%, 7%, 49%, and 35%, respectively. The weight percentages of milk solid and water were falling outside the disclosed weight percentage ranges (i.e., 10-40% of structurant, and 10-30% of water) of the present disclosure. Consequently, the liquid to solid component ratio of 1:1.85, was also falling outside the disclosed weight ratio range (1:2.3-1:9). The separation of ingredients into two phases was observed along with discoloration of the composition. When such a composition was mixed with either water or milk, the level of froth was also reduced, i.e., less than 7 mm. Due to the presence of structurant and water falling outside the disclosed weight percentage ranges, and also the weight ratio (1:1.85) of liquid to solid component falling outside the disclosed weight ratio range (1:2.3 to 1:9) of the present disclosure, therefore, the composition of NWE 11 is considered as anon-working composition. Similarly, in case of NWE 12, the liquid to solid component ratio of 1:10.1 fall outside the disclosed weight ratio range (1:2.3 to 1:9) of the present disclosure. Further, due to the presence of sucrose (sweetener) at a weight percentage of 75%, which falls outside the disclosed weight percentage range of a sweetener (21-60%) of the present disclosure, the viscosity of the composition could not be measured. Further, the composition was so thick that it's stability could not be noted. Moreover, there was separation of ingredients into two phases. Such a composition was not readily solubilised when mixed with either water or milk to prepare coffee. Consequently, the froth level could not be measured. Considering the above observations, the composition of NWE 12 is also a non-working example.

Further, to explore the possibility of kind of alternatives for structurants and sweeteners in the composition, various experiments were conducted. The working compositions of WE 11 to WE 18 with the weight percentage of the ingredients are mentioned in Table 8 and Table 9 below. Referring to Table 8 ad Table 9, the ingredients that are listed under the category of structurant are milk solids, glucose, xylose, galactose, glucitol, and isomalt, and the ingredients that are listed under the category of sweetener are sucrose, xylose, maltitol, sucralose, sorbitol, and artificial sweeteners, such as, *stevia*, aspartame, and saccharin.

TABLE 8

| | Ingredient | | WE 11 | WE 12 | WE13 | WE14 | WE15 | WE16 | WE 17 | WE 18 |
|---|---|---|---|---|---|---|---|---|---|---|
| | | | Compositions (wt. %) | | | | | | | |
| Solid component | Coffee | | 5 | 0.1 | 5 | 5 | 5 | 5 | 5 | 5 |
| | Structurant | Milk Solids | 10 | 12 | 0 | 0 | 0 | 0 | 0 | 0 |
| | | Glucose | 22 | 23 | 22 | 22 | 22 | 22 | 22 | 22 |
| | Sweetener | Sucrose | 40 | 41.5 | 45 | 40 | 40 | 40 | 40 | 40 |
| | Structurant | Xylose | 0 | 0 | 5 | 0 | 0 | 0 | 0 | 5 |
| | | Galactose | 0 | 0 | 0 | 5 | 0 | 0 | 0 | 0 |
| | | Glucitol | 0 | 0 | 0 | 5 | 0 | 0 | 0 | 0 |
| | Sweetener | Maltitol | 0 | 0 | 0 | 0 | 5 | 0 | 0 | 0 |
| | | Stevia (artificial sweetener) | 0 | 0 | 0 | 0 | 5 | 0 | 0 | 0 |
| | | Aspartame (artificial sweetener) | 0 | 0 | 0 | 0 | 0 | 5 | 0 | 0 |
| | | Saccharin (artificial sweetener) | 0 | 0 | 0 | 0 | 0 | 5 | 0 | 0 |

TABLE 8-continued

| | | | Compositions (wt. %) | | | | | | | |
|---|---|---|---|---|---|---|---|---|---|---|
| | Ingredient | | WE 11 | WE 12 | WE13 | WE14 | WE15 | WE16 | WE 17 | WE 18 |
| | | Sorbitol | 0 | 0 | 0 | 0 | 0 | 0 | 10 | 0 |
| | Coffee substitute | Chicory powder | 0 | 0 | 0 | 0 | 0 | 0 | 0 | 5 |
| Liquid component | Water/Solvent | | 23 | 23.4 | 23 | 23 | 23 | 23 | 23 | 23 |
| | Total | | 100 | 100 | 100 | 100 | 100 | 100 | 100 | 100 |
| | Density (gm/Cc) | | 0.1 | 0.35 | 0.48 | 0.57 | 0.69 | 0.41 | 0.73 | 0.8 |
| | Viscosity (Cps) | | 50000 | 56000 | 59000 | 55000 | 44000 | 57000 | 49000 | 48250 |
| | | | | | OBSERVATION | | | | | |
| | Liquid to solid content | | 01:03.3 | 01:03.2 | 01:03.3 | 01:03.3 | 01:03.3 | 01:03.3 | 01:03.3 | 01:03.3 |
| | Product structure stability at more than 48 hrs | | | | Stable product structure obtained with no phase separation within 48 hrs | | | | | | |
| | Color change | | | | No color change within 48 hrs at <25° C. storage | | | | | | |
| | Froth reduction | | | | No froth reduction less 7 mm | | | | | | |
| | Microbial count | | | | No Microbial count detected | | | | | | |

TABLE 9

| | | | Compositions (wt. %) | | | | | | |
|---|---|---|---|---|---|---|---|---|---|
| | Ingredient | | WE 19 | WE 20 | WE 21 | WE 22 | WE23 | WE 24 | WE 25 |
| Solid component | Coffee | | 15 | 20 | 19 | 14 | 10 | 11 | 9 |
| | Sweetener | Maltitol | 23.8 | 25 | 30 | 32 | 31 | 24 | 32 |
| | | Sucralose | 0.2 | 0.1 | 0.1 | 0.5 | 2 | 2.5 | 1.5 |
| | Structurant | Isomalt | 30 | 25 | 24.9 | 21 | 28 | 30 | 30.5 |
| | Sweetener | Sorbitol | 9 | 9.9 | 6 | 5.5 | 7 | 11.5 | 8 |
| | Coffee substitute | Chicory powder | 5 | 4 | 0 | 0 | 0 | 0 | 0 |
| Liquid component | Water/Solvent | | 17 | 16 | 20 | 27 | 22 | 21 | 19 |
| | Total | | 100 | 100 | 100 | 100 | 100 | 100 | 100 |
| | Density (gm/Cc) | | 0.2 | 0.53 | 0.67 | 0.73 | 0.41 | 0.32 | 0.21 |
| | Viscosity (Cps) | | 80000 | 92000 | 83000 | 32000 | 42650 | 39710 | 79000 |
| | | | | | OBSERVATION | | | | |
| | Liquid to solid content | | 01:04.9 | 01:05.3 | 01:04 | 01:02.7 | 1:3.54 | 1:3.7 | 1:4.2 |
| | Product structure stability at more than 48 hrs | | | | Stable product structure; No phase separation was observed within 48 hrs | | | | | |
| | Color change | | | | No color changes within 48 hrs at <25° C. storage | | | | | |
| | Froth reduction | | | | No froth reduction less 7 mm | | | | | |
| | Microbial count | | | | No Microbial count detected | | | | | |

TABLE 10

| | | | Compositions (wt. %) | | |
|---|---|---|---|---|---|
| | Ingredient | | WE 26 | WE 27 | WE 28 |
| Solid component | Coffee | | 14 | 15 | 11 |
| | Structurant | Milk Solids | 13 | 11 | 12 |
| | Sweetener | Maltitol | 25 | 25 | 24 |
| | Structurant | Isomalt | 20 | 20 | 21 |
| | Sweetener | Sucralose | 0.1 | 0.1 | 0.5 |
| | | Sorbitol | 9.9 | 5.9 | 5.5 |
| | Coffee substitute | Chicory powder | 2 | 3 | 5 |
| Liquid component | Solvent | Water | 16 | 20 | 21 |
| | Total | | 100 | 100 | 100 |
| | Density (gm/Cc) | | 0.55 | 0.72 | 0.8 |
| | Viscosity (Cps) | | 72000 | 54354 | 29000 |

TABLE 10-continued

| | Compositions (wt. %) | | |
|---|---|---|---|
| Ingredient | WE 26 | WE 27 | WE 28 |
| OBSERVATION | | | |
| Liquid to solid content | 01:05.3 | 01:04 | 01:03.8 |
| Product structure stability at more than 48 hrs | Stable product structure; No phase separation was observed within 48 hrs | | |
| Color change | No color changes within 48 hrs at <25° C. storage | | |
| Froth reduction | No froth reduction less 7 mm | | |
| Microbial count | No Microbial count detected | | |

From the combined observations of the Table 8, 9, and 10, it can be observed that all the weight percentage of all the ingredients present in the compositions of WE 11 to WE 28 fall within the disclosed weight percentage ranges (0.1-20% of coffee; 10-40% of structurant; 21-60% of sweetener; and 10-30% of water) of the present disclosure. Moreover, the liquid to solid component ratio present in all the compositions of WE 11 to WE 28 was in the range of 1:2.3 to 1:9 as disclosed in the present disclosure. Hence, all the compositions of WE 11 to WE 28 were highly structured stable, and no phase separation of ingredients was observed in these compositions. Even at storing these compositions at a temperature lower than 25° C., there was no change in color of these compositions of WE 11 to WE 28. On reconstituting the compositions of WE 11 to WE 28 with either water or milk, delivered coffee with desired taste, cream and froth on its surface of height not less than 7 mm. Therefore, it can be considered that the presence of all the ingredients within the disclosed weight percentage ranges and the presence of the liquid to solid component in the weight ratio range of 1:2.3 to 1:9 is essential for arriving at a stable aerated beverage composition, which can be stored at even a lower temperature without affecting its color, texture, and taste. Overall it can be inferred that the compositions of WE 9 to WE 28 are the working compositions due to the presence of all the ingredients with weight percentages falling within the disclosed weight percentage range of the composition.

data. The compositions were tested on three parameters, viz, product structure, color change, and froth reduction. When no phase separation in the product (aerated beverage composition) was observed along with the maintenance of consistency, the rating of 2 was given by the panel, on the contrary, if the desirable properties (product structure: no separation and product structure consistency; color change: light-medium dark brown to dark color; froth level in end cup: <7 mm in final prepared end cup with/without milk) were not observed, a rating of 1 was given by the panel. From the observations of the panelist (Table 11) it can be inferred that the weight percentage of all the ingredients were present within the disclosed ranges and the liquid component to the solid component weight ratio present in the compositions of WE 9 and WE 10 was in the range of 1:2.3 to 1:9. Hence, the desirable properties were achieved, i.e., no product separation (physical change/change in color was observed over a period of 6 months for a temperature in a range of 4 to 15° C.). Thus, compositions of WE 9 and WE 10 were stable even at a lower temperature for a longer period of time. Similarly, the observations of all other Working Examples (i.e., WE 11 to WE 28) are in synchronization with the observations for WE 9 and WE 10. As per Table 11, the term "product" relates to the aerated beverage composition of the present disclosure, and the term "end cup" relates to the ready-to-drink beverage of the present disclosure.

TABLE 11

| S. No. | Composition | Parameters | Respondents (*Rating scale 1 or 2) | | | | | |
|---|---|---|---|---|---|---|---|---|
| | | | 1 | 2 | 3 | 4 | 5 | 6 |
| 1. | WE 9 | Product structure | 2 | 2 | 2 | 2 | 2 | 2 |
| | | Color change | 2 | 2 | 2 | 2 | 2 | 2 |
| | | End cup froth | 2 | 2 | 2 | 2 | 2 | 2 |
| 2. | WE 10 | Product structure | 2 | 2 | 2 | 2 | 2 | 2 |
| | | Color change | 2 | 2 | 2 | 2 | 2 | 2 |
| | | End cup froth | 2 | 2 | 2 | 2 | 2 | 2 |
| 3. | NWE 11 | Product structure | 2 | 1 | 1 | 1 | 1 | 1 |
| | | Color change | 2 | 1 | 1 | 1 | 1 | 1 |
| | | End cup froth | 2 | 1 | 1 | 1 | 1 | 1 |
| 4. | NWE 12 | Product structure | 1 | NA | NA | NA | NA | NA |
| | | Color change | 1 | NA | NA | NA | NA | NA |
| | | End cup froth | 1 | NA | NA | NA | NA | NA |

*1 = negative observation; 2 = positive observation

Example 4

Collection of Panel Data

The compositions of working examples (WE) 9 and 10 and non-working examples (NWE) 11 and 12 as described in the Example 3, were further assessed by collecting panel Particularly, it was observed that when the liquid component to the solid component weight ratio was beyond the range of 1:2.3 to 1:9, as in the case of the composition of NWE 11, the aerated beverage composition underwent phase separation, with a change in color (color turned into the dark), and a reduction in froth level of the ready-to-drink was also observed (froth level reduced to 4 mm) upon reconstitution with either water or milk. Thus, it can be inferred that the composition of NWE 11 was not stable over a period of 6 months at a temperature in a range of 4 to 15° C.

Similar to the composition of NWE 11, the composition of NWE 12 was also not stable. Moreover, the liquid component being less than 10 weight percentage led to a product with a thick consistency, which was not amenable for further processing. Similarly, the observations of the non-working example, i.e., NWE 10 are in synchronization with the observations for NWE 11 and NWE 12.

Example 5

Microbial Load

The aerated compositions as disclosed in Example 3 (compositions of WE 9 to 28, and NWE 10 to 12), were further tested for the microbial load. The results of the study are tabulated in Table 7 to 10.

The absence of any micro-organisms (coliforms, yeast, and mold) in the aerated beverage composition were studied. The protocol followed to conduct these experiments are mentioned in Table 12 below. It was observed that no microbial count was seen in the composition of WE 9 to WE 28.

TABLE 12

| S. No. | Parameter | Protocol |
|---|---|---|
| 1 | Total plate count/g | IS 5402: 2012 |
| 2 | Yeast mould count/g | IS 5403: 1999 (RA 2005) |
| 3 | Coliform/g | IS 5401(Part1): 2002 |
| 4 | *E. coli*/g | IS 5887(Part1): 1976 (RA 2005) |
| 5 | *Salmonella*/25 g | IS 5887(Part III): 1999 (RA 2005) |

Therefore, it can be inferred from Tables 7 to 10, and 12 that no microbial count was detected in the compositions of WE 9 to WE 28.

Example 6

Monosaccharide, Oliosaccharide, Polysaccharide to Disaccharide Weight Ratio

The present examples demonstrate the benefits of the aerated beverage composition comprising coffee, solvent, structurant, sweetener in the disclosed weight percentages, in minimizing the recrystallization of sugars and providing coffee with intact texture, desired viscosity, and sweetness. In particular, the present example demonstrates the criticality of the presence of monosaccharide, and/or monosaccharide derivative, and/or oligosaccharide, and/or oligosaccharide derivative, and/or polysaccharide, and/or polysaccharide derivative to disaccharides, and and/or disaccharide derivative in a weight ratio of 1:5 to 1:0.3 essential for arriving at the aerated beverage composition that solves the problem of recrystallisation of sugars. The monosaccharides can be glucose, fructose, galactose, xylose, rhamnose, arabinose, dextrose, mannose, and combinations thereof, the monosaccharide derivative can be sorbitol, mannitol and combinations thereof, the oligosaccharide can be isomalt, galactooligosaccharide, fructooligosaccharide, glucooligosaccharide, xylooligosaccharide, rhamnooligosaccharide, arabinoligosaccharide, mannoligosaccharide, and combinations thereof, and the polysaccharide can be maltodextrin, dextrin, and their derivatives, and combinations thereof. The disaccharide can be sucrose, lactose, maltose, trehalose, and combinations thereof, and the disaccharide derivative can be lactitol, maltitol, and combinations thereof.

Table 13 shows the comparative examples of the aerated beverage compositions with the weight percentage of the ingredients involved in preparing the compositions.

TABLE 13

| | Ingredient (wt. %) | WE 1 | NWE 13 | NWE 14 | NWE 15 |
|---|---|---|---|---|---|
| | Coffee | 15 | 20 | 25 | 14 |
| | Water (solvent) | 21 | 32 | 25 | 9 |
| Structurant | Glucose (Monosaccharide) | 25 | 0 | 05 | 9 |
| Sweetener | Sucrose (Disaccharide) | 39 | 48 | 45 | 68 |
| | MONOSACCHARIDE TO DISACCHARIDE WEIGHT RATIO (1:5 to 1:0.3 or 0.2:1 to 3.33:1) | 0.641:1 | 0 | 0.11:1 | 0.13:1 |
| | OBSERVATION BASED ON SENSORIAL PANEL | Aerated beverage composition soft consistency observed Froth/foam stable No change in color Balanced Sweetness and Coffee Mouth feel after taste No phase separation | Granules in the composition observed within 24 hrs No foam? Froth in the end cup (coffee drink) Color changed to dark Granular texture obtained composition was separated into two phases | Granules in the composition observed within 24 hrs No foam/ Froth in the end cup Color changed to dark a Granular texture obtained and composition was separated into two phase | Granules in the composition observed within 24 hrs High Viscous paste and Further study couldn't be performed |

It can be contemplated that the structurant (glucose), and sweeteners to be added for preparing the aerated beverage composition can be in a liquid form or in a solid form. The components were added in the respective weight percentages provided in Table 13 and mixed to attain an aerated beverage composition. Different weight ratios of glucose (monosaccharide) to sucrose (disaccharide)s are also presented in Table 13.

As discussed in example 1, the composition of WE 1 is considered as the working composition of the present disclosure. Referring to Table 13, it can be observed that due to the presence of glucose (monosaccharide) to sucrose (disaccharide) at a weight ratio of 0.641:1, falling within the weight ratio range (1:5 to 1:0.3 or 0.2:1 to 3.33:1), the composition minimized the problem of recrystallization of sugars.

In case of non-working example (NWE) 13, the ingredients used for preparing the composition to provide an aerated beverage composition failed to further provide a textured and soft coffee drink. The weight percentages of coffee and sucrose were 20% and 48%, respectively, were falling within the range of the weight percentages (0.1-20% of coffee; and 21-60% of sweetener) as disclosed in the present disclosure. However, it was observed that due to the absence of glucose (structurant) and the weight percentage of water (i.e., 32%) falling beyond the range (21-60%) as disclosed in the present disclosure, there was recrystallization of sugars in the composition. Moreover, a separation of ingredients was observed along with a change in the color and formation of granules. Therefore, the composition of NWE 13 failed to deliver desired read-to-drink beverage.

In case of non-working example (NWE) 14, the ingredients used for preparing the composition to provide aerated beverage composition failed to deliver a soft and textured coffee drink. The weight percentages of coffee, and glucose were 25% and 05%, respectively, which were not falling within the range of the weight percentages (0.1-20% of coffee; 10-40% of glucose) as disclosed in the present disclosure. Due to the presence of glucose at a low weight percentage, the weight ratio of glucose (monosaccharide) to sucrose (disaccharide) was 0.11:1. Therefore, in case of NWE 14, the granules were observed in the aerated beverage composition within 24 hours, and the appearance of the composition changed to dark in color. When such a composition was reconstituted with either water or milk, no froth was formed on the surface of the coffee drink.

In case of non-working example (NWE) 15, the ingredients used for preparing the composition to provide the aerated beverage composition failed to deliver a creamy and frothy coffee. The weight percentages of water, glucose, and sucrose were 9%, 9%, and 68%, respectively, which were falling beyond the weight percentage ranges (10-30% of water; 10-40% of glucose; 21-60% of sweetener), as disclosed in the present disclosure. The weight ratio of glucose (monosaccharide) to sucrose (disaccharide) was 0.13:1 which was also falling outside the working weight ratio range (1:5 to 1:0.3) of the present disclosure. Therefore, it was observed that a highly viscous aerated beverage composition was obtained because of which the coffee drink could not be obtained, and the sensory evaluation by the panelist was done further.

Therefore, it can be appreciated that if any one of the ingredients, such as, coffee, water (solvent), glucose (structurant), and sucrose (sweetener) fails to fall within the disclosed weight percentages of the present disclosure and further if the weight ratio of monosaccharide to disaccharide falls outside the disclosed weight ratio range, then the ingredients used for preparing the composition fails to provide aerated beverage composition with desired viscosity, and the chances of recrystallization of sugars also increases. Consequently, such composition fails to deliver coffee desired froth, cream, texture and sweetness.

Table 14 shows working examples of the aerated beverage compositions of the present disclosure, with desired sensorial properties, such as, texture, sweetness, and viscosity. The working examples demonstrate the possibility of using maltodextrin, and dextrin as polysaccharide, and lactose, maltose, sucrose as disaccharides apart from glucose as monosaccharides.

TABLE 14

| | INGREDIENT | WE 29 | WE 30 | WE 31 | WE 32 |
|---|---|---|---|---|---|
| | Coffee | 20 | 10 | 10 | 10 |
| Solvent | Water | 15 | 15 | 15 | 15 |
| Structurant | Glucose (Monosaccharide) | 15 | 15 | 15 | 05 |
| Structurant | Maltodextrin (Polysaccharide) | 10 | 10 | 0 | 20 |
| Structurant | Dextrin (Polysaccharide) | 0 | 0 | 10 | 0 |
| Structurant | Lactose (Disaccharide) | 0 | 0 | 2 | 0 |
| Structurant | Maltose (Disaccharide) | 0 | 10 | 8 | 0 |
| Sweetener | Sucrose (Disaccharide) | 40 | 40 | 40 | 30 |
| | MONOSACCHARIDE, POLYSACCHARIDE TO DISACCHARIDE WEIGHT RATIO (1:5 to 1:0.3 or 0.2:1 to 3.33:1) | 0.625:1 | 0.5:1 | 0.5:1 | 0.83:1 |
| | OBSERVATION BASED ON SENSORIAL PANEL | Consistency observed in the aerated beverage composition. No Granular texture obtained End cup Sweetness balanced | Granules in the composition observed within 24 hrs End cup Sweetness balanced No Granular texture obtained | Granules in the composition observed within 24 hrs End cup Sweetness balanced No Granular texture obtained | No Granular texture obtained End cup Sweetness balanced |

As shown in Table 14, in case of Working Example (WE) 29, the coffee, water, glucose, maltodextrin, and sucrose were present in a weight percentage of 20%, 15%, 15%, 10%, and 40%, respectively. The weight ratio of monosaccharide, polysaccharide to disaccharide was 0.625:1. The weight percentages of the ingredients as mentioned above, fall within the ranges as disclosed in the present disclosure, along with the weight ratio of monosaccharide, polysaccharide to disaccharide. Consequently, no granular texture was obtained, showing that a minimized recrystallization of sugars in the composition of NWE 29. Consequently, the level of sweetness was balanced in the coffee drink prepared from the composition. Therefore, the composition which was prepared by combining the ingredients in WE 29 provided coffee drink with balanced sweetness and texture along with desired foam and cream.

In case of Working Example (WE) 30: respective components mentioned in the weight percentages, for example the weight percentage of coffee, water, glucose, maltodextrin, maltose, and sucrose are 10%, 15%, 15%, 10%, and 40%, respectively. The weight percentages of the above-mentioned ingredients fall within the weight percentage ranges as disclosed in the present disclosure. Further, the weight ratio of monosaccharide, polysaccharide to disaccharide was 0.5:1, also falls within the disclosed weight ratio range (1:5 to 1:0.3) of the present disclosure. Therefore, it was observed that the composition displayed a uniform consistency with no granular texture in the composition. In addition, the level of sweetness was balanced in the coffee drink prepared from the mix. Therefore, the composition which was prepared by combining the ingredients in WE 30 provided ready-to-drink coffee with balanced sweetness and texture. Similar observations were made in the composition of WE 31 and 32, wherein the weight percentage ranges of the ingredients were falling within the disclosed ranges and the weight ratio of monosaccharide, polysaccharide to disaccharide was also falling within the range. Therefore, all the ingredients were mixed to obtain a composition with uniform consistency, and without any formation of granular structure. Moreover, the composition on was reconstitution with either water or milk delivered coffee with balanced sweetness, and without compromising the texture and color.

Therefore, it can be inferred from Table 14 that the presence of all the ingredients within the disclosed weight percentage ranges along with the weight ratio of monosaccharide, and/or polysaccharide to disaccharide ratio in a range of 1:5 to 1:0.3 is important for arriving at the aerated beverage composition that solves the problem of recrystallization of sugars.

Table 15 shows the non-working examples of the compositions having weight ratio of monosaccharide, polysaccharide to disaccharide falling outside disclosed weight ratio range along with the ingredients not falling within the disclosed weight percentages as a result of these compositions fail to provide a coffee drink with desired sensorial properties.

TABLE 15

| | INGREDIENT | NWE 16 | NWE 17 | NWE 18 | NWE 19 |
|---|---|---|---|---|---|
| Solvent | Coffee | 10 | 20 | 05 | 05 |
| | Water | 25 | 20 | 20 | 15 |
| Structurant | Glucose (Monosaccharide) | 05 | 0 | 10 | 0 |
| | Maltodextrin (Polysaccharide) | 50 | 25 | 35 | 45 |
| | Dextrin (Polysaccharide) | 0 | 25 | 15 | 15 |
| | Lactose (Disaccharide) | 0 | 0 | 0 | 05 |
| | Maltose (Disaccharide) | 0 | 0 | 05 | 0 |
| Sweetener | Sucrose (Disaccharide) | 10 | 10 | 10 | 10 |
| | MONOSACCHARIDE, POLYSACCHARIDE TO DISACCHARIDE WEIGHT RATIO (1:5 to 1:0.3 or 0.2:1 to 3.33:1) | 5.5:1 | 5:1 | 4:1 | 4:1 |
| | OBSERVATION BASED ON SENSORIAL PANEL | Paste soft consistency observed End cup Sweetness reduced Thickness of the composition reduced No foam was observed. | Soft consistency observed End cup Sweetness balanced but strong and bitter coffee mouth feel Thickness of the composition reduced | Soft consistency observed End cup Sweetness balanced but less coffee mouth feel Thickness of the composition reduced No foam observed in the end cup | Soft consistency observed End cup Sweetness balanced but less coffee mouth feel Thickness of the composition reduced No foam observed in the end cup |

As shown in Table 15, in case of non-working example (NWE) 16, glucose, maltodextrin, and sucrose were present at a weight percentage of 5%, 50%, and 10%, respectively, which were falling outside the weight percentage ranges as disclosed in the present disclosure. The weight ratio of monosaccharide, and/or polysaccharide to disaccharide ratio (5.5:1) was also falling outside the disclosed weight ratio range (1:5 to 1:0.3). Similarly, in case of non-working example (NWE) 17, the maltodextrin, dextrin, and sucrose were present at a weight percentage of 25%, 25%, and 10%, respectively, which were falling outside the weight percentage ranges as disclosed in the present disclosure. The weight ratio of polysaccharide to disaccharide ratio (5:1) was also falling outside the disclosed weight ratio range (1:5 to 1:0.3). In case of non-working example (NWE) 18, the sucrose, structurant like glucose, maltodextrin, dextrin, maltose, were present at weight percentages of 10%, 10%, 35%, 15%, and 5%, respectively, which were falling outside the weight percentage ranges as disclosed in the present disclosure. The weight ratio of monosaccharide, and/or polysaccharide to disaccharide ratio (4:1) was also falling outside the disclosed weight ratio range (1:5 to 1:0.3). In case of non-working example (NWE) 19, the maltodextrin, dextrin, lactose, and sucrose were present in a weight percentage of 45%, 15%, 5%, and 10%, respectively, were falling outside the weight percentage ranges as disclosed in the present disclosure. The weight ratio of monosaccharide, and/or polysaccharide to disaccharide ratio (4:1) was also falling outside the disclosed weight ratio range (1:5 to 1:0.3). Therefore, it can be observed in all the composition of NWE 16-19, the structurant (glucose, maltodextrin, dextrin, maltose, and lactose), and sweetener (sucrose) were present in the weight percentage falling beyond the disclosed weight percentage ranges (10-40% of structurant, and 21-60% of sweetener) of the present disclosure. Moreover, the weight ratio of monosaccharide, and/or polysaccharide to disaccharide in the all the compositions of NWE 16 to NWE 19 was also falling outside the disclosed weight ratio range (1:5 to 1:0.3), as a result of which the problem of recrystallization was very prominent along with the formation of granules in the composition. Therefore, these compositions, when mixed with either water or milk, failed to provide the coffee drink with the desired level of sweetness and texture. Henceforth, the coffee obtained from the compositions of NWE 16-19 were undesirable for consumers to drink. Therefore, it can be inferred from Table 13, 14, and 15, that presence of structurant, and sweeteners in the weight percentage range of 10-40% and 21-60% along with the presence of monosaccharide, and/or polysaccharide to disaccharide in a weight ratio of 1:5 to 1:0.3 are essential for arriving at the aerated beverage composition of the present disclosure that minimizes the possibility of recrystallization of sugar in the composition which is one of the prominent problems faced in the literature, and also that helps in providing the stable coffee with the desired taste, color, foam, and texture. Further it can be inferred that any deviation in the weight percentage of any of the ingredients mentioned above from the disclosed weight percentage ranges or the absence of said ingredient eventually affects the weight ratio of the monosaccharide, and/or polysaccharide to disaccharide that fails to provide the desired effect.

Example 7

Sensory Panel Data

The compositions of NWE 13, 14, and 15, as disclosed in Example 6 were tested by the panelist on various sensorial parameters, like, flavor, creaminess, mouthfeel, and sweetness.

Table 16 and Table 17 shows the score matrix and the panel data, respectively.

TABLE 16

| Rating Scale Score Matrix | 1-5 |
|---|---|
| Not Acceptable | 1 |
| Acceptable | 2 |
| Just Right | 3 |
| Good | 4 |
| Excellent | 5 |

TABLE 17

| | SENSORY PARAMETERS | | |
|---|---|---|---|
| | NWE 13 | NWE 14 | NWE 15 |
| Flavour | 2 | 2 | NA (Not applicable) |
| Creaminess | 1 | 1 | NA |
| After taste mouthfeel | 1 | 1 | NA |
| Sweetness | 2 | 1 | NA |
| Remarks | Granules observed | Granules observed | The composition as obtained was very thick, and granules were observed. |

Based on the panel ratings provided in Table 17, the observations made on the sensorial features of the compositions of NWE 13 to NWE 15 in Table 13 can be interpreted. Similarly, the observations for the composition of all other NWE 16 to NWE 19 are in synchronization with the observations made for composition of NWE 13 to NWE 15.

Example 8

Comparative Examples

The present example highlights the differences between the aerated beverage composition having structurant and composition having glycerol as humectant in place of the structurant. Table 18 shows a comparative chart between the working composition having coffee, liquid glucose (structurant), sucrose and fructose syrup as sweeteners, and water, and the non-working compositions having glycerol (humectant) in place of structurant.

TABLE 18

| S. No. | Ingredients | | WE 33 | NWE 20 | NWE 21 |
|---|---|---|---|---|---|
| 1 | Coffee | Instant coffee | 14 | 8.1 | 9.3 |
| 2 | Structurant | Liquid Glucose* | 18 | 0 | 0 |
| 3 | Sweetener | Sucrose | 26 | 35.7 | 22 |
| 4 | Sweetener | Fructose Syrup* | 25 | 0 | 21 |
| 5 | Humectant | Glycerol | 0 | 29.6 | 20 |
| 6 | Solvent | Water | 17 | 26.6 | 27.7 |
| | Total | | 100 | 100 | 100 |

TABLE 18-continued

| S. No. | Ingredients | | WE 33 | NWE 20 | NWE 21 |
|---|---|---|---|---|---|
| | Inference | | | | |
| 1 | Stability at <25° C. | | YES | NO | NO |
| | Rancidity/Off taste >48 hrs months Storage | Only Paste/ paste with End cup with milk/ water | NO | YES | YES |
| 2 | Paste Color Change Mild brown to Dark Brown >48 hours | Paste | NO | YES | YES |
| 3 | Scoop ability | Paste | YES | YES | YES |
| 4 | Phase Separation (Water and Solid) <48 hours | Paste | NO | YES | YES |
| 5 | Froth levels reduction in >48 hrs | End cup with Milk/ water | NO | YES | YES |
| | Physical Attributes | | | | |
| 1 | Product Density Gm/Cc (0.01 to 1) | Paste | <1 | >1 | >1 |
| 2 | Product viscosity (Cps) @ 25° C. | Paste | ~300000 Cps | Not Measurable | 99.2 |
| 3 | Froth levels (Zero Day) | End cup with Milk/ water | 7-12 mm | No Froth | No froth |

Note:
1. Glycerol added prototypes shown off taste in the end cup
*The solid content of liquid glucose (83 Brix) and fructose syrup 67 brix considered.

Referring to Table 18, the composition of WE 33 comprised coffee, liquid glucose, sucrose, fructose syrup, and water in a weight percentage of 14%, 18%, 26%, 25%, and 17%, which were falling within the disclosed weight percentage ranges of the present disclosure. The composition of WE 33 was highly stable at even a temperature lower than 25° C. with extended shelf-life for more than 48 months. Further, the composition exhibited a remarkable scoopability with desired viscosity and density ranges. Moreover, no separation of ingredients was observed along with a change in color. On reconstituting said composition with either water or milk, read-to-drink coffee with end cup creaminess was obtained with a high level of froth on its surface.

In case of non-working example NWE 20 and NWE 21, glucose (structurant) was absent in both the compositions. Instead of glucose, glycerol was present in the composition as humectant. Although due to the presence of glycerol, the compositions of NWE 20 and NWE 21 exhibited scoopability (being liquid) however, glycerol was not able to impart structural benefits to either of the composition of NWE 20 and NWE 21. As a result of which, the composition was liquid in nature and hence was not stable at a temperature lower than 25° C. Further, a change in appearance in terms of color was observed along with phase separation of ingredients. Also, the compositions of NWE 20 and NWE 21 on reconstituting with either water or milk, failed to deliver coffee with end cup creaminess and desired taste and mouthfeel. Moreover, a reduction in the froth level was observed after 48 hours. Therefore, the compositions of NWE 20 and 21 were not stable due to the presence of glycerol.

Overall, it can be inferred from Table 18, that the composition of WE 33 comprised all the ingredients in the disclosed weight percentage ranges of the present disclosure. Without adding any additional ingredient, such as, glycerol, the compositions were highly stable at even a lower temperature. Therefore, it is essential to have all the ingredients, such as, coffee, liquid glucose (structurant), sucrose (sweetener), water in the weight percentage ranges of 0.1-20%, 10-40%, 21-60%, and 10-30%, respectively, to arrive at the composition with desired stability. The replacement of any one of the components as mentioned above with any other component fails to provide the desired effect.

Example 9

Process for Preparing the Aerated Beverage Composition
(a) Method for Preparing Coffee Drink from the Aerated Composition Depicted in the Working and Non-Working Examples:

5-15 grams of the aerated beverage composition of the different examples were taken, and to it was added 100-150 ml milk was added. Further, the obtained coffee drink (ready-to-drink beverage) was stirred well to allow complete mixing of milk and the aerated composition. No other step was performed to create frothing of the coffee drink. The temperature of the milk added was in a range of 75-85° C. Single toned milk (3%-8.5% of SNF) was used for the present purpose. However, it can be contemplated that any type of milk can be used to obtain a coffee drink with similar features.

(b) Process Followed for Preparing the Aerated Composition as Depicted in Working Example-1:
 (a) Step 1: 15 g of coffee and 20 g of sucrose in water was mixed while heating at a temperature of 75° C. to obtain a first mixture;
 (b) Step 2: 25 g of liquid glucose and 19 g of sucrose was added to water and heated at a temperature of 125° C. for about 5 minutes to obtain a second mixture; and
 (c) Step 3: First mixture and second mixture were mixed under continuous aeration (by use of aerator) until the density of the mix reaches 0.65 g/cc to obtain an aerated composition.

The process followed for preparing the aerated beverage compositions of the non-working examples was also same as depicted above, having attention to the quantity of the structurant, sweetener, coffee, and solvent mentioned for the respective examples. Also, the type of ingredients used would also change as per the described example. It is well within the purview of a person skilled in the art to prepare the aerated beverage compositions as depicted in all the examples after having gone through the process depicted above.

After preparing the aerated beverage composition, the composition was tested for viscosity and density using the known methods. The viscosity of the aerated beverage composition was measured using established methods, such as using a Brookfield or other viscometer, suitable viscosity is easily recognized from bulk flow characteristics, and the viscosity of compositions of all the working examples was calculated at a temperature of 25° C. The density of the aerated beverage composition as described herein was measured by using established methods, such as using an Anton Paar density meter or Mettler Toledo density analyzer. Density can also be measured manually by mass/volume measurements.

Overall, the combination of the coffee in a weight percentage range of 0.1-20%, structurant in a weight percentage in a range of 10-40%, sweetener in a weight percentage range of 21-60%, and solvent in a weight percentage range of 10-30%, is essential for arriving at the aerated beverage composition of the present disclosure which is highly stable at varying temperature. It is equally very important to have the liquid to solid component in a weight ratio range of 1:2.3 to 1:9 to arrive at the stable aerated coffee composition with no phase separation and change in color. Moreover, the weight ratio of monosaccharide, and/or oligosaccharides, and/or polysaccharides to disaccharides in the range of weight ratio range 1:5 to 1:0.3 is important for achieving the aerated beverage composition which minimizes the problem of recrystallization of sugars. Also, any deviation in the weight ranges of anyone of the aforementioned component from their disclosed ranges fails to provide a frothy, creamy, and stable coffee with desired mouthfeel, texture, color. The absence or replacement of anyone of the aforementioned component with other component also fails to provide the desired effect.

Advantages of the Present Disclosure

The present disclosure discloses an aerated beverage composition comprising coffee having a weight percentage in a range of 0.1-20% with respect to the composition; at least one structurant having a weight percentage in a range of 10-40% with respect to the composition; at least one sweetener having a weight percentage in a range of 21-60% with respect to the composition; and at least one solvent, wherein the aerated beverage composition has a viscosity in range of 10,000-3,40,000 cps. The beverage soft-mix product, apart from being stable retains color as well. Moreover, the ratio of the liquid component to the solid component in a weight ratio range of 1:2.3 to 1:9 helps to ensure a consistent and stable product even at a lower temperature by delivering instant coffee drink with desired sensorial properties to the end-user without the addition of stabilizers and other similar additive compounds. Further, it is observed that the product could be preserved without microbial growth with no added preservatives, hence shows that the composition has stability and shelf life. Also, disclosed herein a simple process for obtaining the aerated beverage composition. Moreover, the weight ratio of monosaccharide, and/or oligosaccharides, and/or polysaccharides to disaccharides of the aerated composition present in the weight ratio range 1:5 to 1:0.3 helps in minimizing the recrystallization of sugars, and thereby ensures that sugars are completely dissolved in the composition. Further, the process involved in preparing the aerated beverage composition as described herein is a simple one which does not involve the use of special steps for entrapping the gas inside the beverage composition or the use of special inert gases for the preparation, thereby being economically feasible.

The aerated beverage composition on reconstitution with either water or milk also provides a creamy and end cup foamable ready-to-drink coffee having a froth level in a range of 7-12 mm. Further, ingredients are simply mixed into a thickened state to provide a ready-to-drink beverage, wherein the taste of the coffee beverage so prepared is not dependent on the skill set of the person preparing such a coffee drink. Therefore, such coffee can also be prepared by anyone not skilled in the art of preparing a coffee drink. Overall, the present disclosure provides a stable aerated beverage composition with desired viscosity and density that deliver delivers a creamy, frothy coffee with desired mouthfeel and texture.

Although the subject matter has been described with reference to specific certain examples and implementations thereof, this description is not meant to be construed in a limiting sense. Various modifications of the disclosed implementations, as well as alternate implementations of the subject matter, will become apparent to persons skilled in the art upon reference to the description of the subject matter. It is therefore contemplated that such modifications can be made without departing from the spirit or scope of the present subject matter as defined.

We claim:

1. An aerated beverage composition comprising:
  a) coffee having a weight percentage in a range of 10 to 20% with respect to the aerated beverage composition;
  b) at least one structurant having a weight percentage in a range of 20-35% with respect to the aerated beverage composition;
  c) at least one sweetener having a weight percentage in a range of 30-45% with respect to the aerated beverage composition; and
  d) at least one solvent selected from the group consisting of water, milk, dissolved milk solids, dissolved non-dairy milk solids, and combinations thereof,
  wherein the aerated beverage composition has a viscosity in a range of 100,000-340,000 cps;
  wherein the structurant and the sweetener comprise saccharides selected from monosaccharide, polysaccharide, oligosaccharide, disaccharide or combinations thereof, and the composition has a weight ratio of monosaccharide and derivatives thereof, or oligosaccharide, or polysaccharide, or combinations thereof to disaccharide, in a range of 1:3.5 to 1:1.2 to prevent recrystallization;
  wherein the monosaccharide, polysaccharide, oligosaccharide, or combinations thereof is in a weight percentage of 10-45% with respect to the aerated beverage composition and the disaccharide is in a weight percentage of 30-70% with respect to the aerated beverage composition;
  wherein the composition has a density in a range of 0.1-0.99 g/cm$^3$, and
  wherein the coffee, the at least one structurant, and the at least one sweetener, is either in a liquid form or a solid form, and the liquid to solid weight ratio is in a range of 1:2.3-1:9.

2. The composition as claimed in claim 1, wherein the at least one structurant is selected from the group consisting of glucose, liquid glucose, galactose, xylose, glucitol, isomalt, lactose, maltose, maltodextrin, trehalose, milk solids, non-diary creamers, and combinations thereof.

3. The composition as claimed in claim 1, wherein the at least one sweetener is selected from the group consisting of sucrose, fructose, liquid fructose, sorbitol, mannitol, maltitol, dextrose, inverted sugar, inverted sugar syrup artificial sweetener, and combinations thereof.

4. The aerated beverage composition as claimed in claim 1, wherein the at least one solvent has a weight percentage in a range of 10-30% with respect to the composition.

5. The aerated beverage composition as claimed in claim 1, wherein the composition further comprises coffee substitutes selected from the group consisting of chicory, herbal extracts, and combinations thereof.

6. A process for preparing the aerated beverage composition as claimed in claim 1, said process comprising: contacting coffee, the at least one structurant, the at least one sweetener, and the at least one solvent, to obtain the aerated beverage composition.

7. The process as claimed in claim 6, said process comprising:
   (a) contacting the coffee, and a first solvent at a temperature in a range of 45-80° C., to obtain a first mixture;
   (b) contacting the at least one sweetener and the at least one structurant to a second solvent at a temperature in a range of 85-125° C., to obtain a second mixture; and
   (c) contacting the first mixture to the second mixture with continuous aeration, to obtain the aerated beverage composition.

8. A ready-to-drink beverage comprising: (a) the aerated beverage composition as claimed in claim 1; and (b) at least one diluent.

9. The ready-to-drink beverage as claimed in claim 8, wherein the ready-to-drink beverage has a weight by volume ratio of the aerated beverage composition and the at least one diluent in a range of 1:30 to 1:10.

10. The ready-to-drink beverage as claimed in claim 8, wherein the at least one diluent is either milk or water, or combinations thereof.

11. A process for preparing the ready-to-drink beverage as claimed in claim 8, said process comprising: reconstituting the aerated beverage composition in the at least one diluent.

12. The process as claimed in claim 11, wherein the reconstituting is done by: (a) obtaining the aerated beverage composition in a range of 5-15 grams; and (b) contacting the aerated beverage composition to at least one diluent in a range of 100-150 ml, to obtain the ready-to-drink beverage.

13. The process as claimed in claim 11, wherein the at least one diluent is either milk or water, or combinations thereof.

14. The process as claimed in claim 11, wherein the at least one diluent has a temperature in a range of 4-95° C.

15. The ready-to-drink beverage as claimed in claim 8, wherein the ready-to-drink beverage has a froth level in a range of 7-12 mm.

16. The aerated beverage composition as claimed in claim 1, wherein the composition is free of microorganisms.

17. The aerated beverage composition as claimed in claim 1, wherein the composition has a homogenous and uniform consistency, and the composition does not contain glycerol.

\* \* \* \* \*